(12) United States Patent
Bowden

(10) Patent No.: US 12,152,646 B2
(45) Date of Patent: Nov. 26, 2024

(54) SHAPED FRICTION DEVICE

(71) Applicant: RFPC HOLDING CORP., Wilmerding, PA (US)

(72) Inventor: Alan Gary Bowden, Laurinburg, NC (US)

(73) Assignee: RFPC Holding Corp., Wilmerding, PA (US)

( * ) Notice: Subject to any disclaimer, the term of this patent is extended or adjusted under 35 U.S.C. 154(b) by 462 days.

(21) Appl. No.: 17/507,198

(22) Filed: Oct. 21, 2021

(65) Prior Publication Data

US 2022/0042561 A1 Feb. 10, 2022

Related U.S. Application Data

(63) Continuation-in-part of application No. PCT/US2020/037162, filed on Jun. 11, 2020.
(Continued)

(51) Int. Cl.
*F16D 65/06* (2006.01)
*B61H 1/00* (2006.01)
*F16D 69/00* (2006.01)

(52) U.S. Cl.
CPC ............ *F16D 65/062* (2013.01); *B61H 1/00* (2013.01); *F16D 2069/004* (2013.01)

(58) Field of Classification Search
CPC .. F16D 65/062; F16D 49/16; F16D 2069/004; F16D 65/0037; F16D 69/0416; F16D 2069/002; B61H 1/00
See application file for complete search history.

(56) References Cited

U.S. PATENT DOCUMENTS 2,162,770 A * 6/1939 Wilson ................. F16D 65/062
188/73.1
5,234,082 A 8/1993 Christie
(Continued)

FOREIGN PATENT DOCUMENTS

EA 016180 B1 2/2012
EP 1063144 A2 12/2000
(Continued)

OTHER PUBLICATIONS

British Patent No. GB 2253448 to Finn published on Sep. 9, 1992.*
(Continued)

*Primary Examiner* — Pamela Rodriguez
(74) *Attorney, Agent, or Firm* — K&L Gates LLP

(57) ABSTRACT

A friction device for a vehicle having a flanged wheel (with a wheel flange and wheel tread) includes a backing plate and a friction structure. The backing plate may interface with a brake actuator of the vehicle. The friction structure is attached to the backing plate and comprises a friction material; the friction structure has a longitudinal flange side, a longitudinal rim side, and two opposing ends, and defines a brake surface for engaging the flanged wheel for braking. The friction structure includes an extended volume portion of the friction material on the longitudinal flange side, which defines a flange contact region of the brake surface. The flange contact region may at least partially engage the flange and to align the friction device with the wheel tread, e.g., the flange contact region may be complementary in shape to at least part of the flange.

20 Claims, 8 Drawing Sheets

Related U.S. Application Data

(60) Provisional application No. 62/859,965, filed on Jun. 11, 2019.

(56) References Cited

U.S. PATENT DOCUMENTS

| | | | |
|---|---|---|---|
| 5,407,031 A | 4/1995 | Christie | |
| 6,769,519 B2 | 8/2004 | Velayutha | |
| 2002/0108824 A1* | 8/2002 | Shute | F16D 65/062 188/251 A |
| 2003/0234142 A1* | 12/2003 | Shute | B61H 1/00 188/250 B |
| 2011/0132705 A1 | 6/2011 | Rumph et al. | |
| 2022/0042560 A1* | 2/2022 | Bowden | F16D 65/062 |

FOREIGN PATENT DOCUMENTS

| | | |
|---|---|---|
| JP | 2009096280 A | 5/2009 |
| RU | 2674727 C2 | 12/2018 |

OTHER PUBLICATIONS

Complete WO document No. WO 2010/017073 to Formolo published on Feb. 11, 2010.*

Office action mailed Apr. 20, 2022 for corresponding Eurasian Patent application 202191863. English translation is also provided. (6 pages).

International Preliminary Report on Patentability mailed Dec. 23, 2021 for corresponding International Application No. PCT/US2020/037162 (9 pages).

International Search Report and Written Opinion for corresponding International Application No. PCT/US2020/037162 (10 pages), Dated Sep. 21, 2020.

Search Report mailed Apr. 20, 2023 for corresponding Eurasian application No. 202390027. English translation provided (5 pages).

Office Action mailed Jun. 26, 2023 for corresponding Eurasian application No. 202390027. English translation provided (5 pages).

* cited by examiner

SHAPED FRICTION DEVICE

CROSS-REFERENCE TO RELATED APPLICATIONS

This application is a bypass continuation-in-part of and claims priority to International Patent Application No. PCT/US2020/37162 (filed 11 Jun. 2020), which claims priority to U.S. Provisional Application No. 62/859,965 (filed 11 Jun. 2019). The entire disclosures of these applications are incorporated by reference herein.

FIELD

Examples of the invention relate to brake systems for vehicles. Other examples relate to friction devices (e.g., brake shoes) for vehicle brake systems.

BACKGROUND

For different braking applications, various types of friction devices (e.g., brake shoes) having different compositions may be used to achieve specific braking requirements. For example, these compositions may include cast iron and various other types of friction materials that are formulated for predetermined applications. Different friction materials will exhibit uniquely different friction characteristics upon a wheel of a rail vehicle, specifically the wheel tread, for braking. Friction characteristics may include reconditioning a wheel tread for removal of surface defects such as shells or spalls.

The shape of current brake shoes, however, may allow for gradual lateral migration of the brake shoe across the tread of a wheel during operation. The lateral migration may result in asymmetric brake shoe wear, which has been associated with asymmetric wheel tread wear. The lateral migration may result in an overhanging brake shoe, which occurs when at least a portion of the brake shoe hangs off the wheel. This may reduce brake effectiveness during a braking operation. Lateral migration may lead to other undesirable conditions such as high contact conicities along the wheel tread and the formation of heat checks on the rim side of a wheel. These conditions may result in a shortened lifespan of the brake shoe and/or of the wheel itself.

Efforts to prevent the negative consequences of lateral migration are often expensive and time consuming in terms of validation and testing. For example, improving the brake rigging associated with the brake shoes adds cost and complexity, as do features like outfitting brake shoe backing plates with metal alignment flanges or the like. Therefore, it may be desirable to provide a friction device (e.g., brake shoe) that mitigates lateral migration, which is different from existing friction devices.

BRIEF DESCRIPTION

A friction device for a vehicle such as a rail vehicle or other vehicle having a wheel (e.g., a flanged wheel having a wheel flange and wheel tread or another wheel) is provided. The friction device may include a backing plate and a friction structure. The backing plate may interface with a brake actuator of the vehicle. The friction structure may be attached to the backing plate and may include a friction material. The friction structure may have a longitudinal flange side, a longitudinal rim side, and two opposing ends. The friction structure may define a brake surface for engaging a wheel for braking. The friction structure may include an extended volume portion of the friction material on the longitudinal flange side. The extended volume portion may define a flange contact region of the brake surface that may at least partially engage the flange (during initial and subsequent use), such as to align the friction device with the wheel tread. For example, the flange contact region may be complementary in shape to at least part of the flange.

BRIEF DESCRIPTION OF THE DRAWINGS

Reference is made to the accompanying drawings in which.

DETAILED DESCRIPTION

Figure 1:
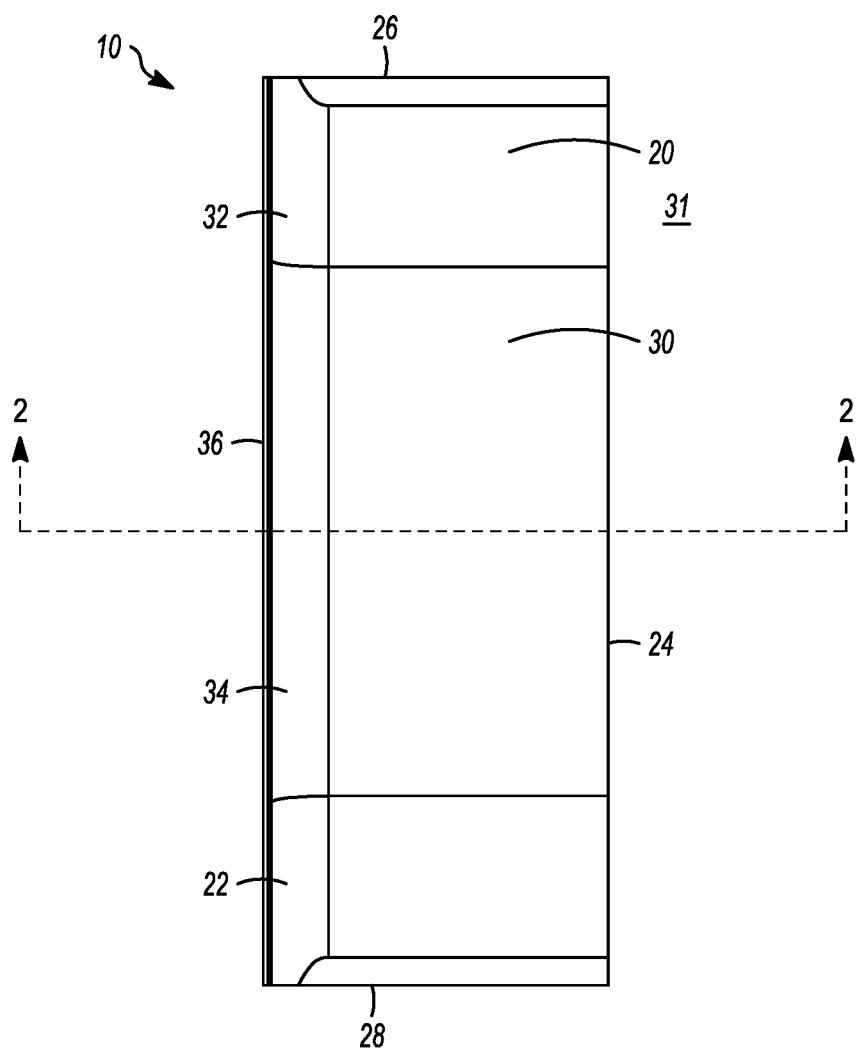
FIG. 1 is a bottom view of an example of a friction device.

The inventive subject matter described herein relates to friction devices for vehicles with wheels. Suitable friction devices may be for flanged or unflanged wheels. The flanged wheels may each include a flange. If present, a flange is used to maintain wheel alignment with and against the track. The wheel may include a tread surface that contacts the top of the rail for tractive effort/propulsion and braking.

In one embodiment, the friction device is a brake shoe for use on a rail vehicle with steel wheel that runs on steel tracks. In this embodiment, the rail vehicles has flanged metal wheels insofar as each wheel may include a flange. The flange may keep the alignment of the steel wheel relative to and in contact with the track and/or may keep the brake shoe aligned with the wheel regardless of the wheel/track alignment. The wheel has a tread that contacts the top of the rail for tractive effort/propulsion and braking.

In one embodiment, a suitable friction device may include a backing plate and a friction structure (e.g., brake pad). The backing plate may interface with a vehicle brake actuator, such as a brake head. The friction structure may be attached to the backing plate and may include (e.g., include or be made from) one or more friction materials. The friction structure may have a longitudinal flange side, a longitudinal rim side, and two opposing ends. The friction structure can define a brake surface for at least partially engaging a wheel for braking. The friction structure may include a tread portion on the longitudinal rim side (which may engage the wheel tread when the friction device is actuated for use), and an extended volume portion on the longitudinal flange side. The extended volume portion may define a flange contact region of the brake surface (e.g., that is complementary shaped to a shape of at least part of the flange) for the extended volume portion to at least partially engage the flange and to align the friction device with the wheel tread when the friction device is actuated. Optionally, the contact region may contact another surface of the wheel to align the friction device with the wheel tread, such as a lateral surface of the wheel).

A shaped friction device may mitigate or prevent lateral migration of the friction device. By reducing lateral movement, this may reduce or prevent uneven or undesired wear of the friction device and/or undesirable interaction between the friction device and wheel. In one embodiment, the friction device may be "extra wide" relative to friction devices without an extended volume portion.

The region of the brake surface defined by the tread portion (e.g., the tread contact region) may engage the wheel tread during use of the friction device for braking. The tread contact region may be curved (e.g., be arcuate or have another non-planar or non-linear surface) in correspondence to the shape of the wheel tread. The flange contact region may be complementary in shape to at least part of the wheel flange. The flange contact region can be angled (e.g., at a non-zero degree angle) relative to the tread contact region.

The extended volume portion may be initially manufactured (e.g., cast, machined, molded, printed, assembled, or otherwise formed) for the flange contact region. This volume portion can be located on an underside of the extended volume portion as part of the brake surface. The extended volume portion may be curved and otherwise dimensioned to correspond to the shape of the flange in a designated area of where the flange contact region will contact the flange when the friction device is installed (in a designated manner for operation) and then actuated for use against the wheel for a braking operation. Thereby, even when the friction device is first or initially used, the friction device may contact the flange in this manner for braking and alignment (e.g., alignment of the friction device relative to both the flange and wheel tread), as opposed to, for example, the friction device eventually wearing into a particular shape over time due to friction from repeated usage.

The friction structure may define both the brake surface generally and the flange contact region more specifically. For example, the curvature or other shape of the flange contact region may be formed in the friction structure. The flange contact region may be supported by the friction structure and may be continuous with the tread contact region of the brake surface. As opposed to, for example, a flange engagement surface being defined and supported by a metal U-shaped alignment flange, or the like, attached to the backing plate, or by some other element other than the friction structure.

The extended volume portion of the friction structure may be extended relative to the tread portion and wheel flange. For example, the extended volume portion may be attached to and laterally extend outward from the tread portion so as to at least partially overlap the flange when the friction device is installed for use. If the tread portion of the friction structure has the same width as a friction device without the extended volume portion, then the friction device may be characterized as being wider or extra wide. The same may be true where the tread portion of the friction structure is the same width as the wheel tread, as may be defined (for example) by the distance between the start of the flange root and the start of the wheel rim curvature on the rim side of the wheel. For example, the tread width may be the width of the surface between the flange root and the rim curvature (generally the tread surface is frustoconical, but in a plane coincident with an the axis of the wheel the distance may be a straight line). Due to the extended volume portion that extends for partially overlapping and engaging with the flange, and where the tread portion of the friction structure is the same width as the wheel tread, the friction device may be wider or extra wide relative to friction devices that have a tread portion the same width as the tread but are lacking an extended volume portion.

The tread portion of the friction structure may be the same width as the wheel tread. Alternatively, a width of the tread portion may be at least 90% the width of the wheel tread, but narrower than the width of the wheel tread. In another embodiment, a width of the tread portion is at least 80% the width of the wheel tread but narrower than the width of the wheel tread. In another example, a width of the tread portion is at least 75% the width of the wheel tread, but narrower than the width of the wheel tread. In another example, a width of the tread portion is at least 70% the width of the wheel tread, but narrower than the width of the wheel tread. In another example, a width of the tread portion is from 70% to less than 100% of the width of the wheel tread. The particular width may be selected based on the material composition of the friction structure, the material (e.g., metal) composition of the wheel, a desired area of friction device-to-wheel contact (when the friction device is installed and used), and a desired level of friction to be obtained between the friction device and wheel during operation.

A maximum thickness of the friction structure at the longitudinal flange side of the friction structure (e.g., a maximum thickness of the extended volume portion at a terminating edge of the extended volume portion), after manufacturing of the friction device is complete but prior to use, may be from 30% to 75% of a maximum thickness of the tread portion of the friction structure (the portion that is positioned for contact with the wheel tread when the friction device is installed for use). The thickness may be defined by a distance between the backing plate (or an intermediate adhesive layer) and the brake surface along a direction normal to a plane of interface between the backing plate (or intermediate adhesive layer) and friction structure. In another embodiment, a maximum thickness of the friction structure at the longitudinal flange side of the friction structure, after the friction device is manufactured but prior to use, may be from 40% to 60%, at least 40%, at least 50%, or the like, of a maximum thickness of the tread portion of the friction structure. In any such examples, thereby, the thickness of the extended volume portion may be a substantial fraction of the thickness of the tread portion of the friction structure, such that the extended volume portion may be an extension of the tread portion and that the flange contact region of the brake surface may be directly and primarily supported by the friction structure. This may be indicative of the extended volume portion (and thereby the flange contact region of the brake surface) contributing to braking over the life of the friction device, or some substantial portion thereof, considering that the flange contact region and extended volume portion may wear at a different rate (e.g., to a lesser extent) than the rest of the friction structure due to differences in forces on different portions of the friction device when the friction device is actuated for use in braking a vehicle.

The flange contact region of the brake surface, defined by the extended volume portion of the friction structure, may extend from the tread contact region of the brake surface in the direction of the longitudinal flange side of the friction device according to a first sectional curvature that matches the shape of the flange root (of the flange of the wheel arrangement with which the friction device is shaped, built, located, configured or designed for use). Continuing in the direction of the longitudinal flange side of the friction device, the flange contact region may include a straight section in correspondence with the shape of the flange. For example, the straight section may be linear along a cross-sectional line in the direction of the longitudinal flange side. Such a straight section can be a cross-section of an arcuately curved surface of the flange contact region as extending between the two ends of the friction structure. From the straight section, or if the flange contact region lacks a straight section, the flange contact region may transition to a different, opposite curvature (e.g., curves in an opposite or other direction), in correspondence with the shape of the transition to the top of the flange. In one aspect, the flange contact region may be S-shaped in a cross-section between the longitudinal rim and flange sides.

In an embodiment, the longitudinal flange side of the friction structure may be dimensioned to terminate no further than the top of the flange when the friction device is installed for initial use with a wheel. The terminal edge of the extended volume portion of the friction structure, as between the ends of the friction structure on the longitudinal flange side of the friction structure, may extend no further than the top of the wheel flange. In this manner, sufficient alignment may be achieved while keeping any overall increased manufacturing costs or complexity (of the friction device with the extended volume portion relative to friction devices otherwise similar but without an extended volume portion) to a minimum or otherwise reduced. In another embodiment, the longitudinal flange side of the friction structure may be dimensioned to terminate further than a top of the wheel flange, in the longitudinal flange direction away from the friction device, when the friction device is installed for initial use with a wheel. The terminal edge of the extended volume portion of the friction structure, on the longitudinal flange side of the friction structure, may extend to and past the top of the wheel flange. Such a configuration may be used, based on the shape/configuration of the wheel flange, if an additional degree of alignment is needed for the application in question. The longitudinal flange side of the friction structure may be dimensioned to terminate, in relation to the top of the flange, within plus or minus 25% of the total width of the flange, reflecting that relatively minor variances on either side of the top of the flange may not significantly affect alignment and braking functionality versus cost/complexity of manufacture.

The entirety of the extended volume portion of the friction structure may be backed by the backing plate. Alternatively, at least an outermost part of the extended volume portion, along the longitudinal flange side of the friction structure, may not be backed by the backing plate. Alternatively, the entirety of the extended volume portion may not be backed by the backing plate. The material of the extended volume portion may be thick enough to support itself and the flange contact region of the brake surface during use, without a backing (either partially or entirely) provided by a backing plate or other support member (e.g., metal support member). Such an arrangement or configuration may be desirable for reducing manufacturing cost or effort, for reducing the weight of the friction device, and/or for enabling use of the same or similar configuration of backing plate both for normal width applications (e.g., a friction structure that may be no wider than the width of the wheel tread) and extra wide applications (e.g., a friction structure that may be as wide as the width of the wheel tread and may have an extended volume portion that extends outwards on the flange side for engagement, during use, with the wheel flange).

A width of the unsupported portion of the extended volume portion of the friction structure, along a normal line extending between the rim and flange sides of the friction structure (lateral axis), may be greater than 0.001% of a total width of the friction structure and/or no more than 35%, no more than 25%, or the like, of the total width of the friction structure. In another embodiment, the width of the unsupported portion of the extended volume portion of the friction structure may be greater than 0% of the total width of the friction structure and no more than 25% of the total width of the friction structure. In another example, at least 75% of the width of the extended volume portion may not be supported by a metal backing plate or other metal support member.

The friction structure may comprise or include a shaped block-like body or bodies of the friction material and other materials/components, which may include the tread portion and the extended volume portion and together define the longitudinal flange side, the longitudinal rim side, the two opposing ends, an upper surface, and a lower or underside surface that defines the brake surface. The tread portion and the extended volume portion may be monolithic (e.g., integrally formed and comprised of the same friction material). This does not preclude one or both portions being provided with metal or other inserts (or other features) after being formed as a monolithic block or otherwise as part of the manufacturing process (e.g., the friction material may be deployed around one or more metal or other inserts disposed in a mold). As a monolithic element and in conjunction with the possible inclusion of inserts, regions of common material type (without grain boundaries at the micro level) may extend between the two portions. Optionally, the tread portion and the extended volume portion may include the same friction material, but may be separately manufactured and then assembled or otherwise attached (e.g., by welding, thermocompression, use of an adhesive, use of mechanical fasteners, etc.). Alternatively, the tread portion and the extended volume portion may comprise different friction materials, and may be separately manufactured and then assembled or otherwise attached. Optionally, the tread portion and the extended volume portion may be integrally formed, such as in a cast or mold, but comprise different friction materials, or the tread portion and the extended volume portion may include one or more common friction materials but regions of different materials. Each of the tread portion and the extended volume portion may comprise a single type of friction material (the same or different as between the two portions), or may comprise plural types of friction materials in different regions, layers, etc.

Regions of the friction material (or other materials) of the tread portion and the extended volume portion may differ in terms of composition, component materials, properties, etc., even if other regions of the two portions have the same composition, component materials, properties, etc. For example, regions of materials of the extended volume portion and the tread portion may have different friction qualities, different wear properties, different hardness levels, different heat transfer qualities, different colors (e.g., for wear indication), etc. For example, the outermost region of the extended volume portion (along the longitudinal flange side) may comprise a material composition that has different properties (e.g., is harder or softer) than those (e.g., hardness) of a material composition of the tread portion of the friction structure, so that the two portions exhibit different wear properties during use, different regions within the same portion (tread portion or extended volume portion) may differ in terms of composition, component materials, properties, etc. For example, the region of the extended volume portion that is positioned/dimensioned to engage the flange root during use of the friction device may comprise a material composition that has different properties than those of a material composition of the region of the extended volume portion that is positioned/dimensioned to engage the top area of the flange during use of the brake, e.g., again, so the two regions exhibit different wear properties during use. It may be desirable, for example, for different parts of the friction device to exhibit different wear properties so that the friction device wears evenly during intended use over the lifetime of the friction device, differences in material thickness and operational forces notwithstanding.

The tread portion and extended volume portion of the friction structure (e.g., body of friction material) may be integrally formed even if these portions are not wholly or partially comprised of the same friction material(s). For example, the two portions may be arranged in a common mold with each portion separately temporarily contained and comprising a different friction material. During subsequent manufacturing steps (e.g., heat and pressure treatment, curing, drying, sintering, etc.) the two portions are allowed to intermingle at their interface, thereby bonding at the micro level, with some intermixing of the different materials at the interface.

The friction structure can define a pad or brake pad. The friction material forming the structure may have a longitudinal flange side, a longitudinal rim side, and two opposing ends, two longitudinal ends, and two lateral ends. At least the two longitudinal ends may have a plurality of protrusions that may engage with the composition friction material at a distance away from the backing plate. Additionally or alternatively, the two lateral ends may include a plurality of protrusions that may engage with the composition friction material at a distance away from the backing plate. The plurality of protrusions may be elongated columns such as pegs with a base portion extending from the longitudinal ends and a head portion extending from the base portion. The plurality of protrusions may be elongated fins extending along the longitudinal ends. The lateral ends may further define at least one groove extending at least partially into the wheel conditioning insert to receive the composition friction material therein. In one example, the friction device may include one or more wheel conditioning insert disposed within the composition friction material. The at least one wheel conditioning insert may be formed of a material different than the composition friction material.

Another example of a friction device may include a backing plate adapted to interface with a brake head of a vehicle and a composition friction material disposed onto the backing plate to form a brake surface of the friction device for engaging a wheel of the vehicle. The composition friction material may have a longitudinal flange side, a longitudinal rim side, and two opposite ends. The friction device may include at least one wheel conditioning insert disposed within the composition friction material including a base portion having a first side nearest the backing plate, a second side extending from the first side in a direction toward the brake surface, and a longitudinal axis. A first insert body extends from the second side of the base portion and offset from the longitudinal axis in the direction of the longitudinal flange side. A second insert body extends from the second side of the base portion and offset from the longitudinal axis in the direction of the longitudinal rim side. The first insert body and the second insert body each comprise two longitudinal ends, two lateral ends, and a wheel conditioning surface for engaging the wheel of the railway vehicle.

Figure 3:
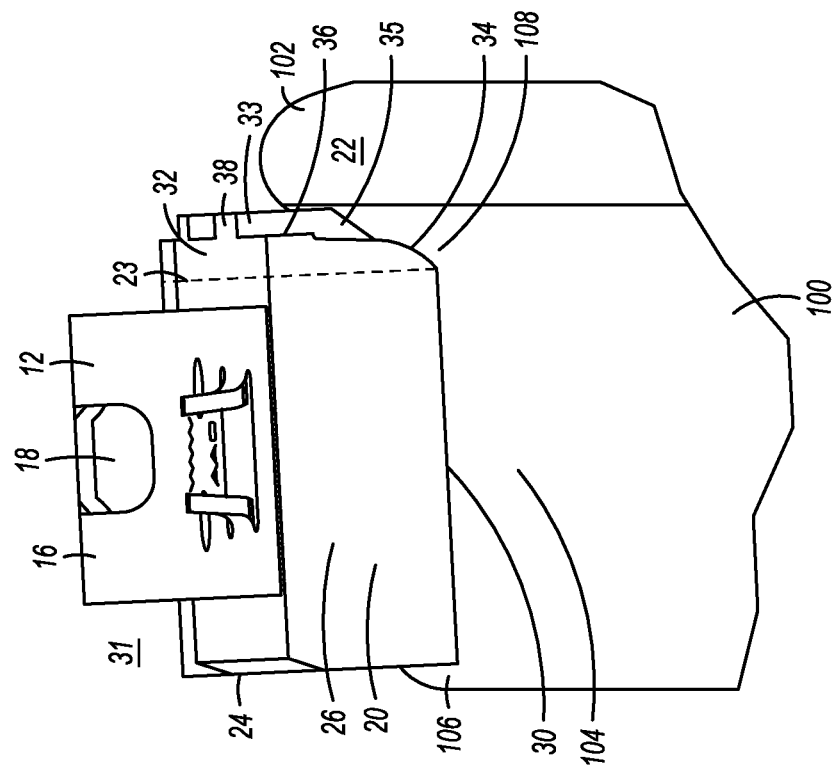
FIG. 3 is an end view of a friction device, according to another aspect of the invention, as applied to a flanged wheel.
Figure 2:
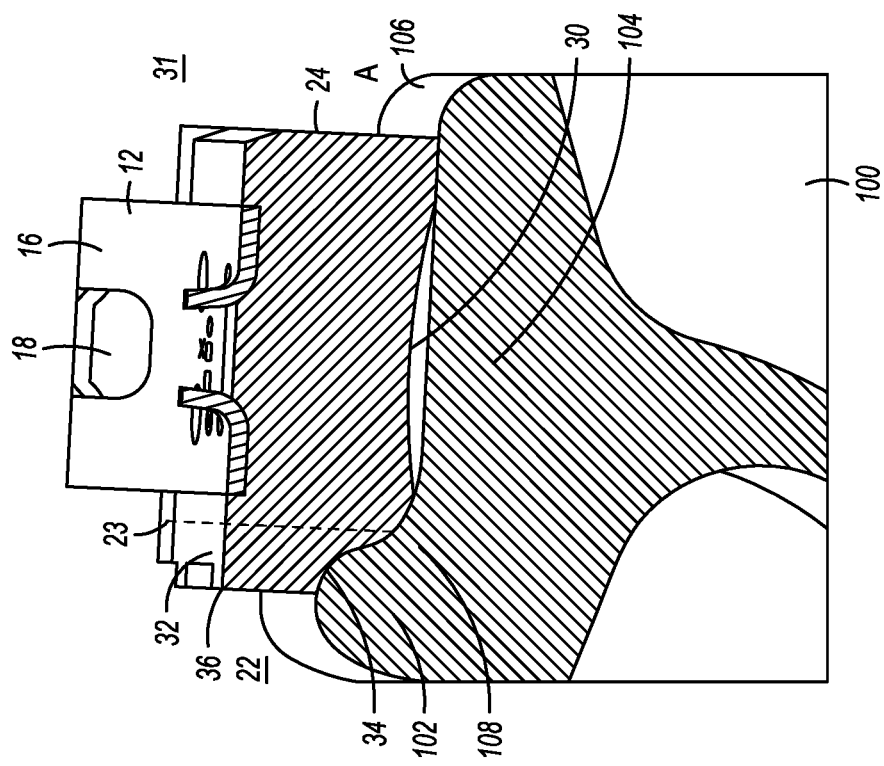
FIG. 2 is a cross-sectional end view of the friction device of FIG. 1 taken along line 2-2, as applied to a flanged wheel.

Referring to FIGS. 1-3, an example of a friction device 10 (e.g., a brake shoe) may include a backing plate 12 and a friction structure 20 (e.g., brake pad) disposed on the backing plate. The friction structure may comprise (e.g., be made or formed of, at least in part) a friction material. The friction structure may include a flange side 22 that may face in the direction of a flange 102 of a flanged wheel 100, a rim side 24 that may face a rim 106 of the wheel, opposite first and second ends 26, 28, and top and bottom surfaces. The flange and rim sides may extend along the length of the friction device, and the opposite ends may extend between and connect the flange side and the rim side. The bottom surface (e.g., underside) of the friction structure opposite the backing plate may define a brake surface 30. By controlling the selection of the material or materials that form the friction structure, the brake surface may exhibit selected (e.g., known and controlled) frictional characteristics in interaction with a wheel or other moving element when the brake surface is selectively brought to bear against (e.g., pressed against) the wheel or other moving element. For example, for a given material composition of the friction structure, there may be a higher degree of friction between the friction structure and the wheel for a given application force than if the friction structure was comprised of different materials. When the friction device is actuated for use, frictional interaction between the friction device and wheel converts kinetic energy of the wheel and vehicle into thermal energy (e.g., heat), thereby braking/slowing the wheel and vehicle. Thus, the brake surface may be dimensioned and/or otherwise configured so that when the friction device is installed and actuated for use in braking, the brake surface contacts the wheel in order to apply a friction force to the wheel. For example, if the wheel tread is frustoconical (as may be the case for rail vehicle wheels), the brake surface may be generally arcuate (along the long axis of the friction device) and slightly tapered (along a short or cross axis of the friction device) in correspondence.

The friction structure may include a tread portion 31 and an extended volume portion 32 (also referred to as a flange engagement portion or flange alignment portion). The tread portion can extend between the two ends and may extend from the rim side of the friction structure (where the tread portion at least partially defines the rim side) in the flange direction to where the friction structure meets the extended volume portion (e.g., along an interface region generally indicated by line 23 in the drawings). An underside of the tread portion defines a tread contact region of the brake surface. The tread contact region is arranged and configured (e.g., dimensioned and positioned) to engage the wheel tread when the friction device is installed for use and actuated for braking. The extended volume portion may extend between the two ends and out from the tread portion in the direction of the flange to terminate at and at least partially define the flange side of the friction structure. An underside of the extended volume portion may define a flange contact region 34 of the brake surface, which is complementary shaped to at least part of the flange (e.g., to a flange root 108 and/or to the top region of the flange). Thereby, the flange contact region may engage or abut the flange (e.g., flange root and/or top region of the flange) during use of the friction device.

Figure 13:
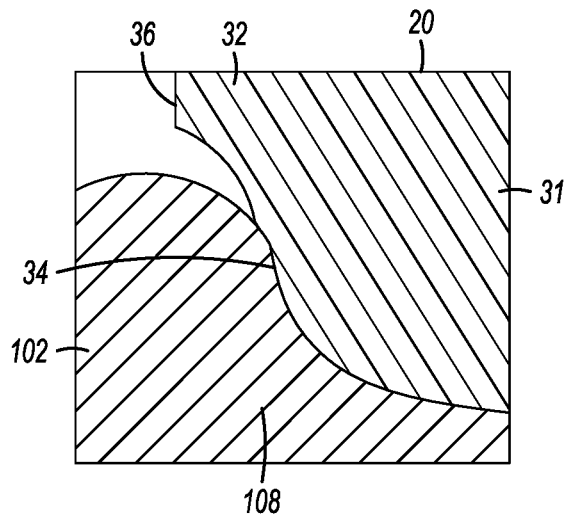
FIG. 13 is a detailed sectional view of an interface between a wheel flange and an example of a friction device.

As shown in FIGS. 2-3, the flange contact region may be arranged and shaped to engage with and be complementary to the flange including the flange root. The extended volume portion may include an exposed surface 36. The bottom edge of the exposed surface may rest on the top of the flange while the flange contact region is engaged and in contact with the flange. The bottom edge of the exposed surface may still rest on the top of the flange when the flange contact region is engaged and in contact with the flange root. For example, the flange contact region may be shaped and disposed (e.g., positioned and dimensioned) to contact the flange root when the friction device is actuated, but not the top or top region of the flange. The extended volume portion may either terminate before reaching the top or top region of the flange, or even if the extended volume portion overlaps with the top region of the flange there is a space between the overlap of the extended volume portion and the top region of the flange when the friction device is actuated (see FIG. 13 as one example). In other examples, such as shown in FIG. 2, the flange contact region may contact both the flange root and the top region (e.g., top) of the flange when the friction device is actuated.

The flange contact region of the brake surface may be arcuate along the length of the friction structure between the ends to match the rounded (e.g., conical) shape of the wheel. Crosswise (e.g., from the perspective of FIG. 2), the flange contact region may be S-shaped, multi-segmented (e.g., a series of connected straight line sections, or a series of different connected curved sections, or a series of alternating straight and curved sections), or otherwise shaped to at least partially engage the flange during use. In examples, the brake surface may be configured for the entirety of the flange contact region to contact and engage the flange when the friction device is actuated. In other examples, the brake surface may be configured for only portions of the flange contact region to contact and engage the flange when the friction device is actuated. The flange contact region may be the region of the brake surface defined by the extended volume portion, at least part of which, and not necessarily all of which, may contact at least part of the flange during use of the friction device. The degree or extent to which the flange contact region contacts the flange during use of the friction device may change over time. For example, as noted above, and as shown in FIG. 13, the brake surface may be configured for the terminal edge portion of the flange contact region (e.g., as generally indicated by an edge 36) to not engage the top region of the flange while the friction device is actuated.

Figure 14:
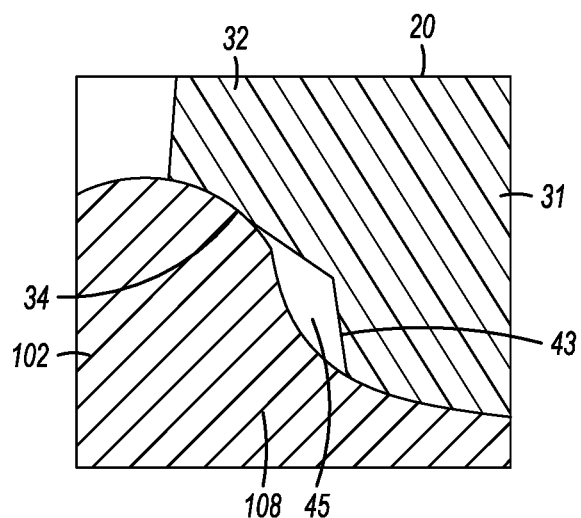
FIG. 14 is a detailed sectional view of an interface between a wheel flange and another example of a friction device.
Figure 15:
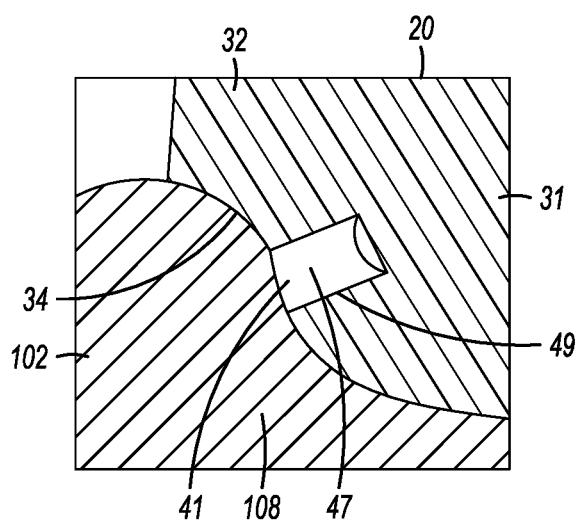
FIG. 15 is a detailed sectional view of an interface between a wheel flange and another example of a friction device.

As another example, with reference to FIG. 14, the brake surface may be shaped for an intermediate portion of the flange contact region to lie away from (e.g., not contact) the flange when the friction device is actuated. In this example, from a cross-sectional perspective, the flange contact region of the brake surface may include multiple straight sections 43 that can form a trough-like notch or indentation in and along the extended volume portion of the friction structure. A gap 45 may be established between the extended volume portion and the flange in an intermediate area in between two contact areas while the friction device is actuated for use and the flange contact region contacts the flange. Alternatively, the gap could be a curved indentation or another shape of indentation, or there could be multiple different indentations of the same or different configuration. For example, as shown in FIG. 15, a gap could be established by a void 47 in the material with a circular or oval or other opening (e.g., the extended volume portion could include one or more voids each defined by a circular, oval, polygonal, or irregular opening 41 in the flange contact region of the brake surface), and an associated sidewall 49 extending from the opening into the material of the extended volume portion. It may be desirable to provide such features, in whole or in part as a function of friction device and wheel frictional interaction properties, to control or tailor the friction engagement and wear characteristics of the friction device and/or wheel over time. For example, with an indentation or void in the material (such as would establish an area of gap between the friction material and flange during use of the friction device), there could be less frictional interaction between the extended volume portion and the flange initially, but as the friction structure wore down over time, the gap might diminish and/or eventually entirely disappear, potentially increasing the degree of frictional interaction between the extended volume portion and flange. A tapered feature (e.g., indentation, void, etc.) could result in a gradually changing friction profile over time, where a feature (indentation, void, etc.) with a perpendicular side wall(s) (relative to the wear surface) could result in a substantially constant friction profile until the material around the feature wore down to the point where the feature was gone, at which point, if applicable (e.g., if there was still an underlying layer of friction material) there would be an increase in friction as a step-function.

The seating of the flange contact region on or against the flange (including, in examples, the seating of the exposed side generally atop the flange) may serve to keep the friction device in place against the wheel and aligned with the wheel tread. The seating of the flange contact region on the flange may, therefore, help prevent the lateral migration of the friction device toward the rim. Because the extended volume portion engages with the flange (e.g., with the flange root) during repeated use of the friction device, the extended volume portion may help prevent or slow the lateral migration of the friction device against the wheel flange. Additionally, the extended volume portion may help keep the flange side, rim side, and/or brake surface in proper locations against the wheel during use.

In the example of FIG. 2, the tread portion and the extended volume portion of the friction structure are integrally formed and comprised of the same friction material (e.g., the friction structure (including the two portions) may be monolithic). This does not preclude, however, the friction structure including tread conditioning inserts, or the like, disposed in the material in one or more examples. Additionally, from a cross-sectional perspective along at least part of the length of the friction device, the brake surface is continuous, with the region defined by the tread portion extending seamlessly into the region defined by the extended volume portion. There may be other regions of the brake surface, away from the portion shown in FIG. 2, that include seams, grooves, voids, etc., for example. Further, as noted, prior to initial use, a thickness of the extended volume portion at the terminal edge 36 may be from 30% to 75% (e.g., 40% to 60%) of the maximum thickness of the tread portion.

The extended volume portion of the friction structure may include a volume of one or more friction materials. The material(s) may be same or different type(s) as that of the tread portion of the friction structure. The volume of the friction material(s) may laterally extend outward from the tread portion in the direction of the wheel flange (when the friction device is installed and with the tread portion aligned with the wheel tread. An underside of the volume of friction material(s) may define the flange contact region of the brake surface. The extended volume portion may be integral with the tread portion or may be attached thereto in another manner. The tread portion and extended volume portion may share a common lateral axis (see dotted line "A" in FIG. 2, for example) defined as a straight line extending from the terminal edge of the extended volume portion on the flange side of the friction structure to the terminal edge of the tread portion on the rim side of the friction structure. Both terminal edges may define the furthest extent of any friction material of the friction device (at least at that section of the friction device), and where there is continuous friction material(s) along the common lateral axis.

Referring now to FIGS. 3-6, the extended volume portion may include one or more protrusions 38 extending from the exposed side in the direction of the wheel flange. The protrusions may engage the wheel flange (see, e.g., FIG. 10), to assist with aligning the friction device relative to the wheel, so that the flange side, rim side, and/or brake surface may be in designated locations against the wheel during use. The protrusions may help with braking (by providing additional material to seat against the flange during use of the friction device), and with preventing lateral migration of the friction device.

Figure 5:
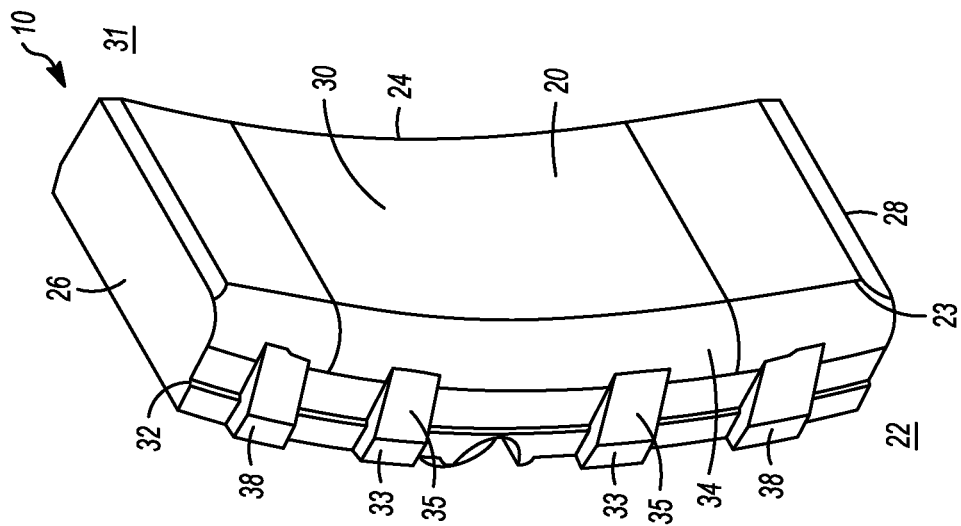
FIG. 5 is a perspective view of the friction device of FIG. 3.
Figure 4:
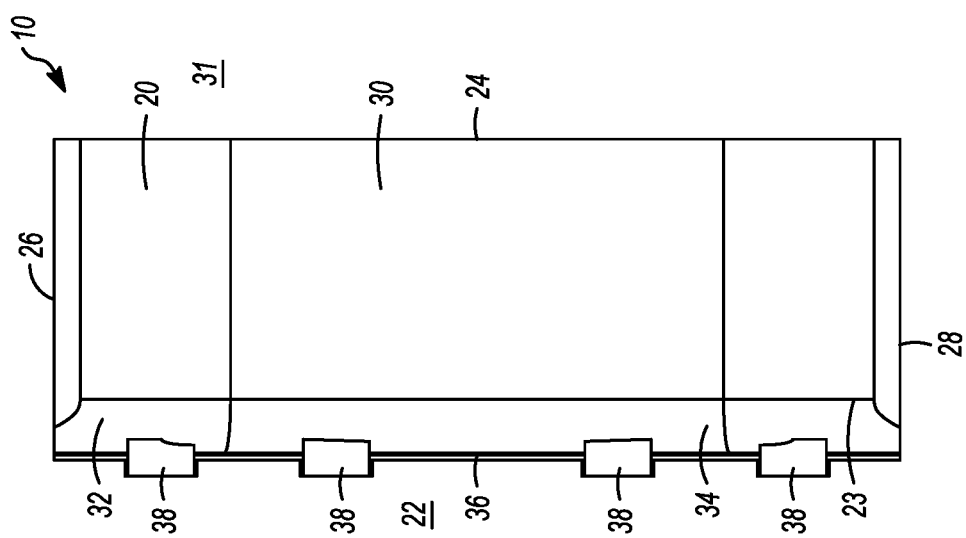
FIG. 4 is a bottom view of the friction device of FIG. 3.
Figure 7:
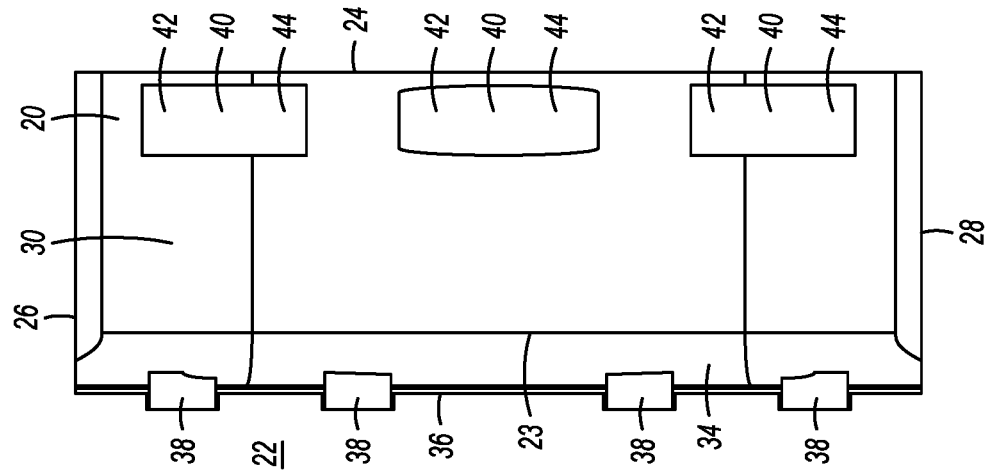
FIG. 7 is a bottom view of another example of a friction device.

As shown in FIG. 5, the extended volume portion may be generally arcuate in correspondence to the shape of the wheel along the length of the extended volume portion between the two ends and including the side 36 of the extended volume portion. The protrusions may extend or stick out from (e.g., protrude from) the arcuate surface in the flange direction, and may be spaced apart from one another. These protrusions can form or establish alternating sections of protruding material and recesses along the length of the extended volume portion and longitudinal flange side. The protrusions may be evenly spaced apart from one another. Optionally, the protrusions may be unevenly spaced apart from one another. Or, the protrusions can be arranged in groups, with the protrusions being evenly spaced apart within each group but different distances between the groups. For example, as shown in the example in FIG. 7, the protrusions in a first pair are spaced apart by a given distance, which is the same distance between the protrusions in a second pair, but the two pairs are spaced apart by a different, longer distance. In the example of FIG. 7, there are four protrusions, but in other examples there may be more protrusions or fewer protrusions. The protrusions may have the same configuration (e.g., material composition, shape, and/or dimensions) or different configurations.

In examples, the protrusions may be polyhedral solids. For example, as shown in FIG. 5, the protrusions may have two parts or portions 33, 35. The first part or portion 33 may have a rectangular parallelepiped shape while the second part or portion 35 may have a triangular polyhedron shape (e.g., tetrahedron, pentahedron, triangular prism-shape or wedge shape, quadrilateral pyramid, etc.) Alternatively, the first and second parts of the protrusions may be provided in other shapes to achieve a desired character or aspect of interaction with the wheel flange, as is described herein. The first part may directly engage with the wheel flange while the second part may be tapered as the second part extends toward the flange contact region of the brake surface to engage with the flange root (and/or with the flange elsewhere). In one example, the first part and the second part may both be tapered (either the same or differently), to facilitate designated alignment of the friction device with the wheel. Alternatively, in other examples, neither the first part nor the second part may be tapered. In this instance, the first part and the second part may wear away by repeated uses of the friction device against the wheel.

One or more of the protrusions may comprise the same material or material(s) as the extended volume portion and/or the tread portion. Alternatively or additionally, one or more of the protrusions may comprise a different material or materials than the extended volume portion and/or the tread portion. One or more of the protrusions may be integrally formed with the extended volume portion (e.g., as a monolithic structure). Alternatively or additionally, one or more of the protrusions may be separately manufactured from the extended volume and then attached to the extended volume portion by an adhesive, mechanical fasteners, welding, etc. In one example, the tread portion, extended volume portion, and plural protrusions are integrally formed and comprised of the same material(s). For example, all the protrusions of the friction device may be integrally formed with the extended volume portion and tread portion and made of the same material(s). In another example, plural but fewer than all of the protrusions are integrally formed with the extended volume portion and tread portion and made of the same material(s), whereas the remaining, non-integral protrusion(s) are made of a different material or materials and attached to the extended volume portion. For example, the integral protrusions could be comprised of a friction material, and the other, non-integral protrusions could comprise a metal or metal alloy, for flange conditioning of the wheel.

An example of a suitable friction structure is a brake pad. The brake pad may be useful to slow or stop a vehicle. Suitable vehicles may include automobiles, trucks, busses, mining equipment, aircraft, and railway vehicles. Railway vehicles may include locomotives and railcars, and may be for transport of freight and/or passengers. The friction structure may be formed of a friction material. The friction material optionally may include filler material.

In one example, a suitable friction material is rated for a Rubbing Pressure (RP) in a range of less than about 800 Newton/square centimeter (N/cm2). In other embodiments, the RP may be in a range of from about 801 N/cm2 to about 1000 N/cm2, in a range of from about 1001 N/cm2 to about 1500 N/cm2, or greater than about 1501 N/cm2. In one example, a suitable friction material is rated for a Rubbing Speed (RV) in a range of less than about 20 m/s, in a range of from about 21 m/s to about 30 m/s, in a range of from about 31 m/s to about 50 m/s, or greater than about 51 m/s. In one example, a suitable friction material is rated for Continuous Temperature operation (CT) in a range of from about 300° C. to about 350° C., from about 351° C. to about 400° C., from about 401° C. to about 450° C., or greater than about 451° C. In one example, a suitable friction material is rated for Short Term Temperature (ST) in a range of from about 500° C. to about 600° C., from about 601° C. to about 700° C., from about 701° C. to about 800° C., from about 801° C. to about 900° C., or greater than about 901° C. The preceding ranges are based at least in part on, and determined by, the friction material selection, the physical configuration, and the end use application of the friction device.

In other examples, a suitable friction structure may include be semi-metallic. Semi-metallic may include a non-metallic matrix, such as a ceramic or a polymer, with a metallic filler. For example, a semi-metallic puck of iron or copper powder may be bound together by a ceramic or polymer. The fill content may be selected based at least in part on the desired performance of the friction material and friction structure made therefrom. Suitable filler content may be expressed as a ratio of metallic material to matrix material by volume or by weight. In various examples, a suitable ratio may be in a range of less than 50% by weight, in a range of from about 51% to about 75% by weight, from about 76 to about 90% by weight, or greater than 91% by weight. For example, a suitable formulation may be 90 grams of metal per 10 grams of matrix. In various examples, the fill content for the friction structure may be metal, as disclosed, a non-metal, or a combination of metal and non-metal materials. The selection may be made with reference to the end use parameters.

The ceramic/iron materials may be mixed, compressed, and/or sintered at a high temperature to form a solid friction structure. Suitable binding or matrix materials may include one or more of resin (such as phenol formaldehyde), graphite (which can serve as a friction material, zirconium silicate and the like. An example formulation, including binder, is shown in Table 1.

| Constituent | Approx. range % by weight |
|---|---|
| Aluminum Silicate | 25-35 |
| Bronze particles | 10-20 |
| Graphite | 5-15 |
| Vermiculite | 10-20 |
| Phenolic resin | 10-20 |
| Steel fibers | 3-7 |
| Rubber particles | 3-7 |
| Silicon dioxide particles | 1-5 |
| Aramid fibers | 1-5 |

The powder size, fiber size, concentration distribution, grain size distribution, and morphology may be selected or controlled to affect performance of the friction structure. If the fill content is a powder, suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the friction structure; and in other examples, the more edged particles provide relatively more aggressive friction and conditioning than the smoother or rounder particles. The hardness of the material selected as the filler powder, in combination with the filler content, and particle morphology can contribute to the performance of the friction structure. If the fill content is a fiber, the fiber thickness and fiber length may be selected or controlled to affect performance. The fiber may be the same material as the powder fill content, and the fill content may be a mixture of powder and fiber in one example. Other suitable fibers may be formed from an aromatic polyamide or aramid, such as Kevlar™, Twaron™, Nomex™, and Technora™. Other suitable fibers may be formed from an aliphatic or semi-aromatic polyamides, such as Nylon™. Polymeric fibers may include one or more copolymers to control and affect crystallinity, melting or softening points, and the like. The length of the fibers may be controlled to affect performance. Suitable fiber lengths may be in a range of less than about 1 millimeter (mm), in a range of from about 1.1 mm to about 2 mm, in a range of from about 2.1 mm to about 5 mm, or in a range of greater than about 5.1 mm. Fiber thickness may be selected to control and affect performance. Suitable fiber thickness may be in a range of from about In one example, the fibers have a Denier in a range of less than about 20 d, in a range of from about 21 d to about 100 d, in a range of from about 101 d to about 500 d, in a range of from about 501 d to about 1500 d, in a range of from about 1501 d to about 3000 d, or greater than about 3000 d selected based at least in part on application specific parameters.

Suitable polymer or polymeric matrices may include phenolics, urea-formaldehyde, epoxy, cyanate ester, aromatic heterocyclics (such as Polyimides, polybenzoxazoles (PBOs), polybenzimidazoles, and polybenzthiazoles (PBTs)), inorganic and semiorganic polymers (such as may be derived from silicon-nitrogen, boron-nitrogen, and phosphorus-nitrogen monomers), and silicon-based polymers, as well as mixtures and copolymers of the foregoing. The polymeric matrix, along with other additives, may include a flame retardant. Suitable flame retardants may include a composition that includes one or more of aluminum, phosphorus, nitrogen, antimony, chlorine, bromine, and in some applications magnesium, zinc, and carbon.

Figure 6:
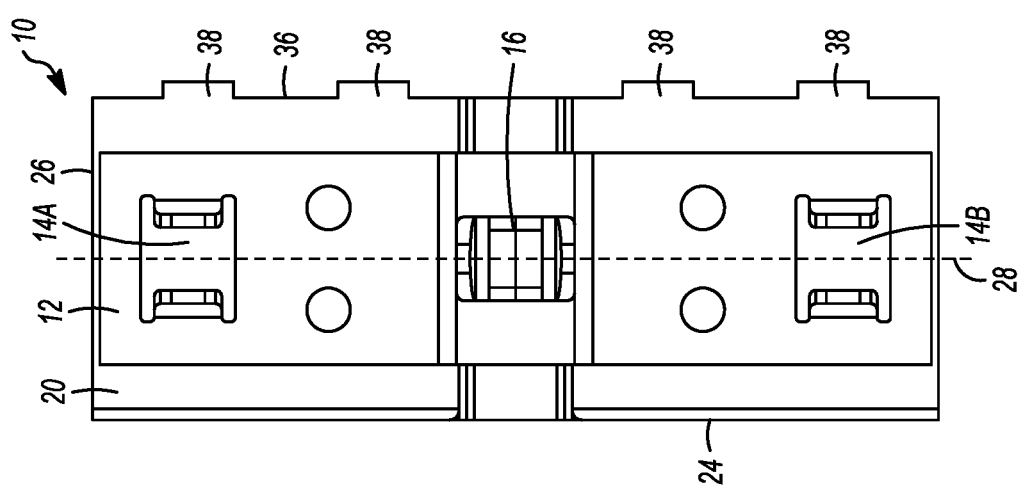
FIG. 6 is a top view of the friction device of FIG. 3.

Referring now to FIG. 6 as one example, examples of the friction device include the backing plate that supports and carries the friction structure. Suitable backing plates may be made of metallic material or non-metallic material, or a combination or composite material. Suitable metallic materials may include iron, iron alloys, aluminum, titanium, etc. Suitable iron alloys may include steel. In one example, the backing plate may be made of a reinforced composite material, e.g., carbon fiber-reinforced polymer. The backing plate may be coated. Suitable coatings may include galvanic coatings (particularly if the backing plate is formed of a corrodible metal), paint, and anodized layers. Suitable paints include enamel, epoxy, and powder coatings.

The backing plate may have a top surface and a bottom surface, and may be generally arcuate in shape, or otherwise shaped in correspondence with the shape of the wheel (or portion thereof) with which the friction device is configured for use. The backing plate may be curved axially so as to follow the curvature of a wheel. The axis for the curve may be a wheel axis. In one example, the friction structure may be curved and may be coaxial to the wheel, while the backing plate follows the curve of the friction structure to be coaxial to the wheel. In another example, the backing plate may be curved but may not be coaxial with the wheel or with the working surface of the friction structure. The degree of separation of the curvature of the backing plate relative to the friction structure may be selected based on application specific parameters.

The backing plate may have surfaces that are relatively smooth, and may have one or more defined apertures therethrough and/or protrusions extending therefrom. In one example, the backing plate may be undulate so as to increase the surface area of the backing plate (relative to a backing plate that does not include undulations). An increased surface area may provide more bonding surface to which the friction structure may bond. The undulations may be dispersed evenly across the backing plate, or may be patterned so that some undulations are at a proximate edge or some undulations are concentrated nearer the center line. The undulations may run the length of the backing plate, or may be oriented width-wise. Undulations may impart stiffness in the direction of their run, and flexion perpendicular to their run. In one example, the undulations direction is skew relative to the length and the width of the backing plate. In one example, a checkered pattern or equivalent is present to allow for control over the stiffness and the flexion of the backing plate while still increasing the surface area. Various patterns and similar effects can be created by selecting either a uniform thickness of the backing plate (and thus by bends in the plate) or by using non-uniform thicknesses across the backing plate.

In one example, the width of the backing plate is the same as the width of the friction structure. In another example, the width of the backing plate differs from the width of the friction structure. A backing plate that is smaller than the width of the friction structure may be sufficient to perform the support function of the backing plate, while reducing overall weight and/or cost. A backing plate that is larger than the width of the friction structure may be sufficient to perform the support function of the backing plate, while providing enhanced support to edges of the friction material. In one example, the width ratio of the backing plate to the friction structure, the length ratio of the backing plate to the friction structure, and the ratio of the backing plate's thickness to a starting thickness of the friction structure is, independently of each other, in a range of less than about 0.5, in a range of from about 0.6 to about 0.9, about 1, in a range of from about 1.1 to about 1.2, in a range of from about 1.2 to about 1.5, or in a range of greater than about 1.6. Suitable backing plate arrangements may include a full unbroken plate, a mesh, a wire form, a reinforced wire form, a mesh, or a molded composite. The foregoing may be selected based at least in part on end use parameters.

In one example, the width of the friction device's working (or brake) surface relative to the wheel tread (which includes at least a portion of the wheel flange that touches the friction device during use) is in a range of less than about 35%, in a range of from about 36% to about 50%, in a range of from about 51% to about 75%, in a range of from about 76% to about 100%, or greater than about 101%. A suitable friction device width may vary from side to side or from end to end. A suitable shape of the friction structure may follow a contour of wheel, having a matching complementary profile. This shaped edge may be formed with one or more of a chamfer, ridge, edge, or radius. In one example, only one edge of the friction structure is contoured. In another example, both edges are contoured to allow for installation in either orientation. In one example, the friction device may fit to a new vehicle wheel having a diameter in a range of less than about 600 mm, in a range of from about 601 mm to about 1300 mm, or in a range of greater than about 1301 mm.

For rail vehicle applications, the backing plate may include a pair of rejection lugs 14a, 14b. The rejection lugs may be integrally formed with the backing plate and may extend from a top surface of the backing plate. The rejection lugs are sized and positioned to mate with corresponding rejection lug receptacles on a corresponding vehicle brake head. The rejection lugs may be compatible with a variety of brake heads, or the lugs may only correspond with certain types of brake heads in order to prevent the installation of the friction device in incompatible systems. The friction device may include a keybridge 16. The keybridge may be integrally formed with the backing plate or the keybridge may be attached to the backing plate prior to installation. Like the backing plate, the keybridge may be made of a metallic material or a reinforced composite material. The keybridge may be coupled to a brake head of a vehicle (e.g., a railway vehicle). As shown in FIGS. 2 and 3, an opening 18 in the keybridge may accept a locking key which fastens the friction device to the railway vehicle brake head. The keybridge may take any shape necessary to facilitate fastening of the keybridge to a designated configuration of brake head.

The friction structure is affixed to and extends from the bottom surface of the backing plate. The friction structure may be affixed to the backing plate with an adhesion/adhesive layer (not shown). Alternatively, the friction structure may be affixed to the backing plate by mechanical fasteners, welding, or similar operations, thermocompression, etc. Alternatively, or in conjunction with any of the attachment means described herein, the friction structure may be deposited onto the backing plate, or the friction structure may be formed and attached to the backing plate in a combined operation, e.g., a backing plate may be disposed in a mold that receives the friction material(s) for forming the friction structure on the backing plate in the mold. (In such an example or otherwise, the backing plate may include features that protrude up into the friction material, for helping to affix the friction structure to the backing plate and/or for carrying out functions like wheel conditioning during use of the friction device.) The friction structure may be affixed to the backing plate by means that may be selected based at least in part on application specific parameters.

A suitable friction structure may include an outer layer that is the first to contact a wheel surface when newly installed. This outer lay may perform one or more of the following functions: prevent exposure of the friction material during storage, transport or installation to corrosion, chipping, moisture or fouling; provide an initial coating to the wheel surface on the first few rotations after installation and braking to condition or treat the wheel surface; to condition the wheel surface and remove any debris or corrosion; to fill in cracks, pits and defects in the wheel surface; and the like. In one example, the outer layer is removed from the working surface of the friction structure through friction in the first few rotations during braking after installation. In one example, the outer layer is peeled off after installation or a part of the installation process.

The friction structure may include one or more wear indicators. In one example, the wear indicators are molded into the friction material of the friction structure. A suitable location for the wear indicator is at the back of the shoe. The backing plate may form the wear indicator, or may have material removed to allow a wear indicator to be visible. Other suitable locations for wear indicators may include proximate to an end, around a periphery, at the centerline of the friction structure, at a distal end (or both ends) of the friction structure, as a part of a conditioning insert, or the like. During use, the wear indicators allows an observer to determine useful life of the friction structure. In one example, a groove is formed in the friction structure from the working surface down to a determined depth. During use, the depth of the groove diminishes as the working surface is worn away. An observer would then look for the groove and determine life by its remaining depth (or absence if it was at end of life and completely worn away). Other examples of wear indicators may include a differently colored portion of the friction structure. Or, the conditioning insert may perform the wear indication function. In one example, a radio frequency identification (RFID) chip (or equivalent) is disposed in the friction structure at the depth for which the end of life is set for the friction structure. When the friction structure is worn to expose the RFID chip, the chip will no longer function and provide a signal in response to a query (for passive chips, active chips may broadcast signals and the absence of a broadcast signal would indicate end-of-life). Naturally, an RFID sensor would communicate with the wear indicator chip and thereby one could determine when a brake change was needed.

In examples, one or more wheel conditioning inserts may be disposed within the material of the friction structure. The wheel conditioning insets may interact with a wheel for a function other than primarily for braking, e.g., to clean, scrape, treat, or otherwise condition the wheel tread, rim, and/or flange. FIG. 7 shows one example of rectangular wheel conditioning inserts 40 disposed within the friction structure, e.g., in this example there are three inserts. The wheel conditioning inserts each include a respective elongated portion 42. The elongated portion has a wheel conditioning surface 44 that extends along the brake surface adjacent to and generally parallel with the rim side of the friction structure (e.g., a long axis of the surface 44 is generally parallel to the rim side). In this configuration, the wheel conditioning surfaces of the wheel conditioning inserts are positioned to condition the rim of the wheel (e.g., to mitigate hollow wheel wear or otherwise). Prior to initial use of the friction device, the friction device may be configured for the wheel conditioning surface to be exposed to and flush with the brake surface. It is contemplated that the wheel conditioning inserts may be initially fully encapsulated within the friction structure of the friction device. In this instance, repeated braking of the vehicle will wear away the outer layer of the composite friction material, eventually exposing the wheel conditioning surfaces of the wheel conditioning inserts to the wheel. During initial use of the friction device, the wheel conditioning inserts are covered with friction material, but after use of the friction device the wheel conditioning inserts may eventually become exposed for wheel conditioning.

Figure 8:
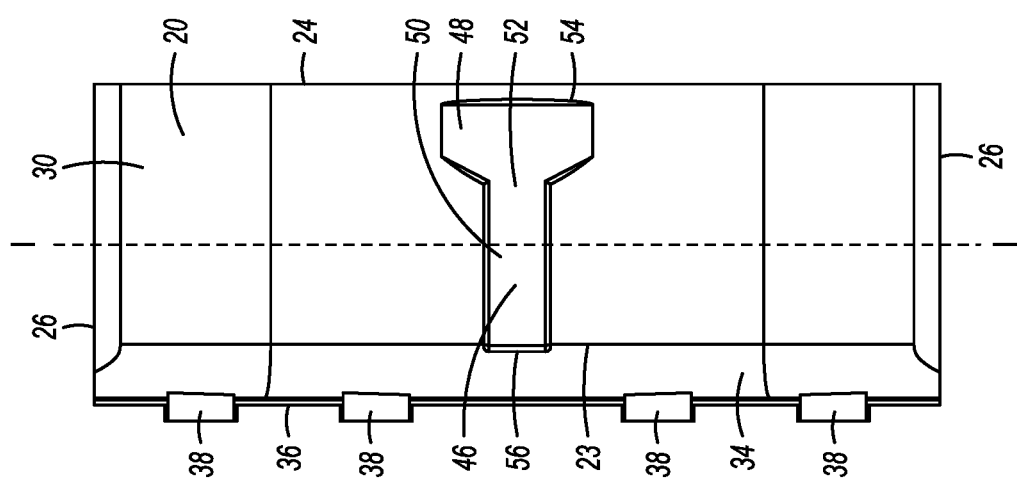
FIG. 8 is a bottom view of another example of a friction device.

In another example, as shown in FIG. 8, a T-shaped wheel conditioning insert 46 may be disposed within the friction structure. The T-shaped wheel conditioning insert has a first elongated portion 48 and a second elongated portion 50 both of which form the wheel conditioning surface 52. The first elongated portion has an end 54 that extends along the brake surface adjacent to and generally parallel with the rim side of the friction structure. The second elongated portion extends along the brake surface generally perpendicular to the first elongated portion. The second elongated portion has an end 56 that is adjacent to the flange side of the friction structure. A central axis I-I of the friction device, equidistant between the flange side and the rim side, crosses the T-shaped wheel conditioning insert substantially halfway between the ends of the insert. With the first elongated portion adjacent to and extending along the rim side and the second elongated portion disposed in a central location along the brake surface, the T-shaped wheel conditioning insert, when applied to the wheel, may condition both the wheel tread and the wheel rim. This configuration conditions the wheel tread, removing tread defects while simultaneously conditioning the wheel rim (e.g., for removing rim defects and reducing the rate of hollow wheel wear).

The wheel conditioning inserts may comprise a hardened material such as cast iron or another metal or metal alloy, or any material with abrasive properties suitable for a desired degree or character of conditioning interaction between the inserts and a wheel material. The wheel conditioning inserts may be formed of a material harder and/or more abrasive than the friction material of the friction structure. As the friction device is applied to the surface of the wheel, the wheel conditioning inserts contact the wheel's surface. The abrasive properties of the wheel conditioning inserts may condition the wheel surface to prevent, reduce, or remove defects. Along with the conditioning properties, the wheel conditioning inserts serve to provide an additional braking force that may be helpful in adverse weather conditions.

A conditioning insert material and other parameters may be selected with reference to the conditioning function and the friction material may be selected with reference to the braking or friction function. Thus, they may contain similar materials in some examples, but the compositions differ such to perform their intended function. This difference may be substantial (e.g., a metal conditioning insert within a composite friction structure) or may be relatively subtle (e.g., both are ceramic iron metal-filled structures, with one having a different concentration of metal content). In one example, the conditioning insert may be formed of a material relatively harder and/or more abrasive than the friction structure. For example, the wheel conditioning insert may be formed of a material with suitably abrasive properties for the wheel conditioning insert. As the friction device may be applied to the surface of a wheel, the wheel conditioning insert rubs against the wheel surface. The abrasive properties of the insert conditions the wheel surface to prevent, reduce, or remove defects.

A suitable wheel conditioning insert may be formed from a relatively hard material. Suitable materials may be metal. Suitable metal may include one or more of Al, Si, P, S, Cl, Ti, V, Cr, Mn, Fe, Co, Ni, Cu, Zn, Mo, Sn, Sb, Tl, and oxides, carbides, and alloys of the foregoing. In one example, the metal is iron or an iron alloy. Suitable iron, and iron alloys, may include those as used in, and process to form, cast iron, forged iron, wrought iron and the like. Suitable cast iron may include malleable cast iron or ductile cast iron. Other suitable iron inserts include treated iron, regardless of its manufacturing process. Suitable treated irons may include phosphated iron, nitrided iron, heat treated iron, and the like. Some steels may be used in various examples. The steel may have controlled amounts of carbon and/or chromium, as well as a controlled ratio of martensite relative to cementite structure. Selecting the alloy content may control the hardness, and therefore the performance of the conditioning insert. In other examples, the conditioning insert may include a non-ferrous metal.

In other examples, a suitable conditioning insert may include a non-metallic matrix, such as a ceramic or a polymer, preferably with a metallic filler. For example, a puck of iron powder or iron filling filled ceramic may be used. The iron may be the same, or different, from the identified suitable iron types. The fill content may be selected based at least in part on the desired performance of the conditioning insert. Suitable filler content may be expressed as a ratio of metallic material to matrix material by volume or by weight. In various examples, a suitable ratio may be in a range of less than 50% by weight, in a range of from about 51% to about 75% by weight, from about 76 to about 90% by weight, or greater than 91% by weight. For example, a suitable formulation may be 90 grams of iron powder per 10 grams of ceramic matrix. The ceramic/iron materials may be mixed, compressed, and sintered at a high temperature to form a solid conditioning insert. The powder size and grain size distribution may be controlled to affect performance, as well. Suitable powder size averages may be in a range of less than 100 micrometers, in a range of from about 101 micrometers to about 250 micrometers, in a range of from about 251 micrometers to about 500 micrometers, or greater than about 501 micrometers. The grain size distribution may be in a range of from about 0.5 to about 1, from about 1 to about 2, or greater than about 2 as a distribution relative to mean particle size. The morphology of the particles may be selected from suitable shapes. Suitable shapes may include spherical, ovoid, irregular, flake, and polygonal. In some examples the more surface area of the particle, the lower the friability of the conditioning insert; and in other examples, the more edged particles provide relatively more aggressive friction and conditioning than the smoother or rounder particles. The hardness of the material selected as the filler powder, in combination with the filler content, and particle morphology can contribute to the performance of the conditioning insert. In one example, the wheel conditioning insert may be formed of a material relatively harder and/or more abrasive than the friction material. For example, the wheel conditioning insert may be formed of a material with suitably abrasive properties for the wheel conditioning insert. As the friction device may be applied to the surface of a wheel, the wheel conditioning insert rubs against the wheel surface. The abrasive properties of the insert conditions the wheel surface to prevent, reduce, or remove defects.

Although various wheel conditioning inserts are shown, other examples may have a different number (e.g., more or fewer) of wheel conditioning inserts utilized along the rim side that is determine with reference to application specific parameters. Further, in other examples, these inserts may have a shape other rectangular and selected to condition the wheel rim. Other suitable shapes may be selected with reference to the desired performance, but polygonal and ovoid shapes may be broadly useful across use types. The wheel conditioning surface may remove imperfections from the wheel when in use and/or may impart a coating layer on the subsequently conditions surface. The shape of the inserts, the number of inserts, the insert material, and other factors (such as volume, weight, density, and end use application) may be selected to achieve a desired and proportional effect from the insert.

Figure 9:
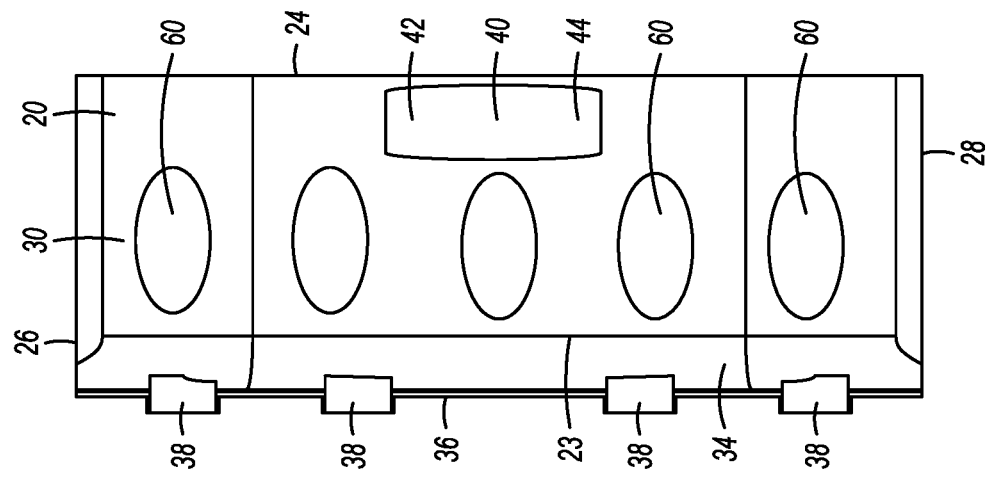
FIG. 9 is a bottom view of another example of a friction device.

Referring now to FIG. 9 as one exemplary example, one or more voids 60 may be formed within the friction structure. Each void may be an entirely empty and hollow volume, alternatively may include materials other than the friction composite material, may be filled with gas (e.g., air or other than air), or may contain no gas (e.g., a vacuum). In examples where the void in the friction material is filled with a filler material, suitable void filler materials may include metallic, inorganic, and organic material. Suitable metallics include relatively softer metals. Example metals may include tin, zinc, lead, aluminum, copper, and the like, as well as mixtures, oxides, and alloys thereof. Suitable inorganic materials may include silicon and silicon-based oxides thereof; with yet other materials containing molybdenum or lithium in amounts and locations that lubricate and/or reduce wear. A suitable void filler may be a solid extreme-pressure and/or extreme-temperature lubricant. Suitable lubricants may include graphite and/or molybdenum disulfide to provide protection under heavy loadings. The solid lubricants may bond to the surface of the metal, and thereby reduce or prevent metal-to-metal contact and the resulting friction and wear when the lubricant film gets too thin. Solid additives such as copper or ceramic powder may be added to the lubricant for static high pressure and/or high temperature applications, or where corrosion might be a concern. These compounds may work as a release agent. Suitable organic materials may include carbon and polymeric materials.

The void filler polymeric materials can be homogeneous or can be composite or filled polymers. These filled polymers may include metals, such as that used for the conditioning insert, but in concentrations and/or morphologies that differ from the conditioning insert. In other examples, the filled polymers that constitute the void filler may include non-metallic aggregates such that the overall weight of the friction structure is less than one with no voids. If a relatively harder void filler is desired, particles such as silicon carbide, aluminum oxide or silicon oxide particles may be used. If a relatively softer void filler is used, then iron oxide or zinc oxide particles may be used. The selection of filler aggregate may include mixtures of different particles types, particle sizes, and particle size distributions. The binding agent may be selected, as well as the concentration of filler particles, to control and affect the action of the void filler and/or friction structure on the respective wheel surface, the overall weight of the friction structure, and the like.

The voids may constitute a varying amount of the working surface of the friction structure during the life of the brake device. In one example, the ratio of working surface (capable of contacting the wheel surface) and the cross sectional area of the void at the working surface is less than 5% (and in some cases zero at various life stages of the friction structure), in a range of from about 6% to about 10%, in a range of from about 11% to about 25%, in a range of from about 26% to about 50%, in a range of from about 51% to about 70%, in a range of from about 71% to about 80%, or in a range of greater than about 81%.

In one example, there may be more than one void. In one example, there may be less than about 50 voids. Note that the voids may be spaced at different thickness levels in the friction structure such that an unused friction structure has zero voids exposed, but a partially or fully used friction structure has some percentage of its working surface exposed as voids (absence of friction material). In one example, the voids are placed such that as the friction structure wears different locations of the wheel surface contact the friction structure owing to the void placement and thus exposure at that point in the life cycle. In one example, the voids define a channel that can run the length (or width) of the brake device. In some examples, the channel may operate to allow cooling air flow through the friction structure during use, and may provide an egress for particulate and/or water if such are present during use.

Suitable void shapes may be circular, ovoid or ovular, or elliptical in cross sectional profile or shape. Other suitable void shapes may include T-shaped and X-shaped. In one example, the void is shaped as a cone, a hemi-sphere, a full sphere, a cylinder, a cube or cuboid, a triangular prism, a triangular pyramid, a pentagonal prism, a pentagonal pyramid, a tetrahedron, a hexagonal pyramid, parallelepiped, hexagon, other prism, a torus, an ellipsoid, an icosahedron, and the like. The voids may be shaped based at least in part on the specific end use parameters. Suitable shapes may be polygonal. In one example, the shape may be capable of reducing some of the volume of composite friction material in order to reduce the wear applied to the wheel tread. The void, as shown, may be conical or tapered, having a larger cross-sectional area at the brake surface which tapers or reduces to a smaller cross-sectional area nearest the backing plate. The void may be elongated in a direction perpendicular to the axis I-I. Orienting an elongated void may have a technical effect of reducing wear of along a width of a wheel tread.

The presence of voids in the friction structure may lessen the amount of wear the brake shoe contributes to the wheel tread in some examples. The use of some void materials may contribute to conditioning, may lubricate, and/or may reduce weight. By varying the relative amount of available working surface area (brake surface) as the friction structure wears, the braking capacity of the brake shoe may be controlled.

For example, if the void(s) is/are shaped so that the void cross sectional profile decreases in response to wear of the friction structure the result may be a relative increase in working surface area, and more available braking capability. Conversely, a configuration may be selected such that the exposed void cross sectional area increases in response to wear, and that may have the effect of reducing a braking capability of the brake shoe as it wears. In one example, the relative amount of working surface available remains constant during its use and irrespective of the amount of wear. Even as the working surface area remains constant the location(s) of the void(s) and the relative wear pattern caused by the complementary working surface on the wheel surface may change.

Figure 11:
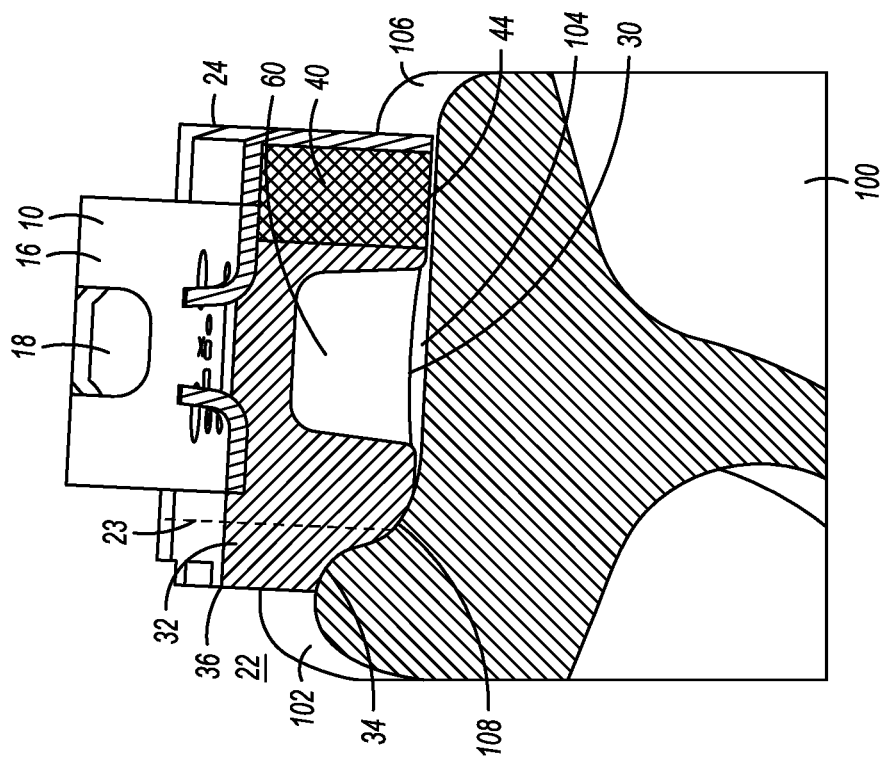
FIG. 11 is a cross-sectional end view of the friction device applied to the flanged wheel of FIG. 10 along line 11-11.
Figure 10:
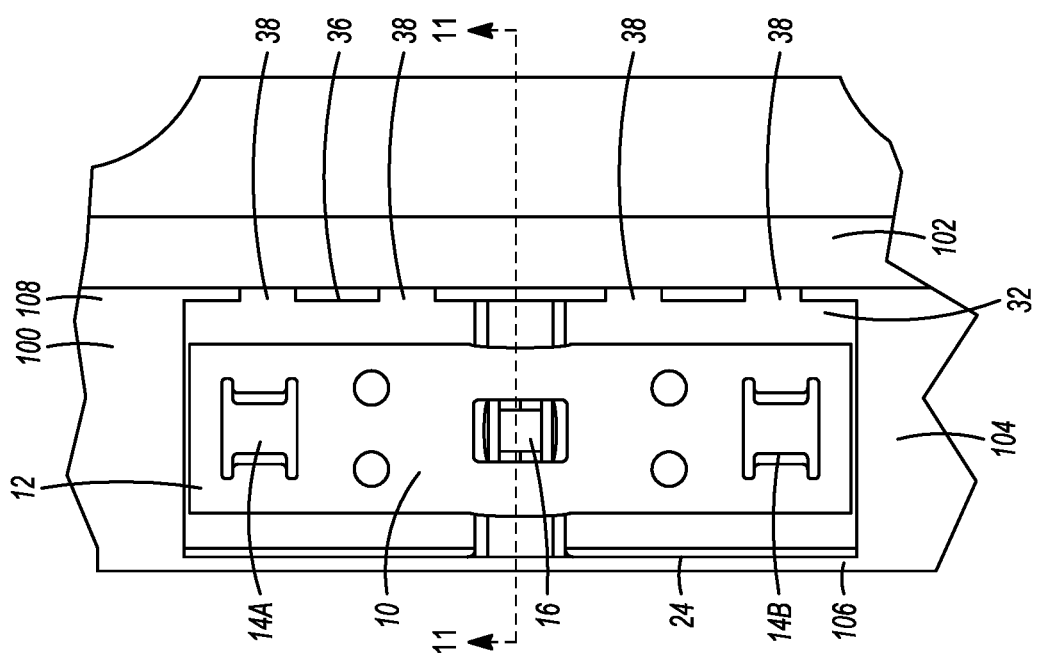
FIG. 10 is a top view of the friction device of FIG. 9 applied to a flanged wheel.

In examples, for each void the material of the friction structure may define an opening in the brake surface, and one or more sidewalls extending from the opening into the material. The voids may be generally aligned with the wheel tread when applied to the wheel as shown in FIGS. 10 and 11. The voids may serve to lessen the amount of wear the friction device contributes to the wheel tread. The voids lack friction material in their respective locations, and this lack of friction material prevents the wheel tread from continually wearing away when the friction device is applied to the wheel. The void openings as shown are substantially circular, oval, or elliptical in shape, but in other examples the voids (openings and/or sidewalls/interior) may take any shape, such as polygonal, capable of reducing some of the volume of friction material in order to reduce the wear applied to the wheel tread. The voids, as shown, may be conical or tapered, having a larger cross-sectional area at the brake surface which tapers or reduces to a smaller cross-sectional area nearest the backing plate. In FIG. 9, the voids are shown with a rectangular wheel conditioning insert 40, however the voids can be used in conjunction with T-shaped conditioning inserts or other inserts. In another example, a friction device includes one or more voids but lacks any conditioning inserts. It is contemplated that the additional features of the friction device described herein can be utilized in any functional combination on a friction device.

In examples, an area of the opening of each of at least one of the voids (or the respective areas of all the voids), coincident with the brake surface, is from 2% to 6% of the entire area of the brake surface. In another example, the area of the opening of each of at least one of the voids (or the respective areas of all the voids), coincident with the brake surface, is from 3% to 4% of the entire area of the brake surface. This approximately reflects the geometry illustrated in the example of FIG. 9, as representative of an example of one possible application (where some material at the brake surface/wheel interface is lacking, to achieve the functions as stated herein, while the overall friction device still provides a typical desired level of friction interaction with a wheel for braking).

Figure 12:
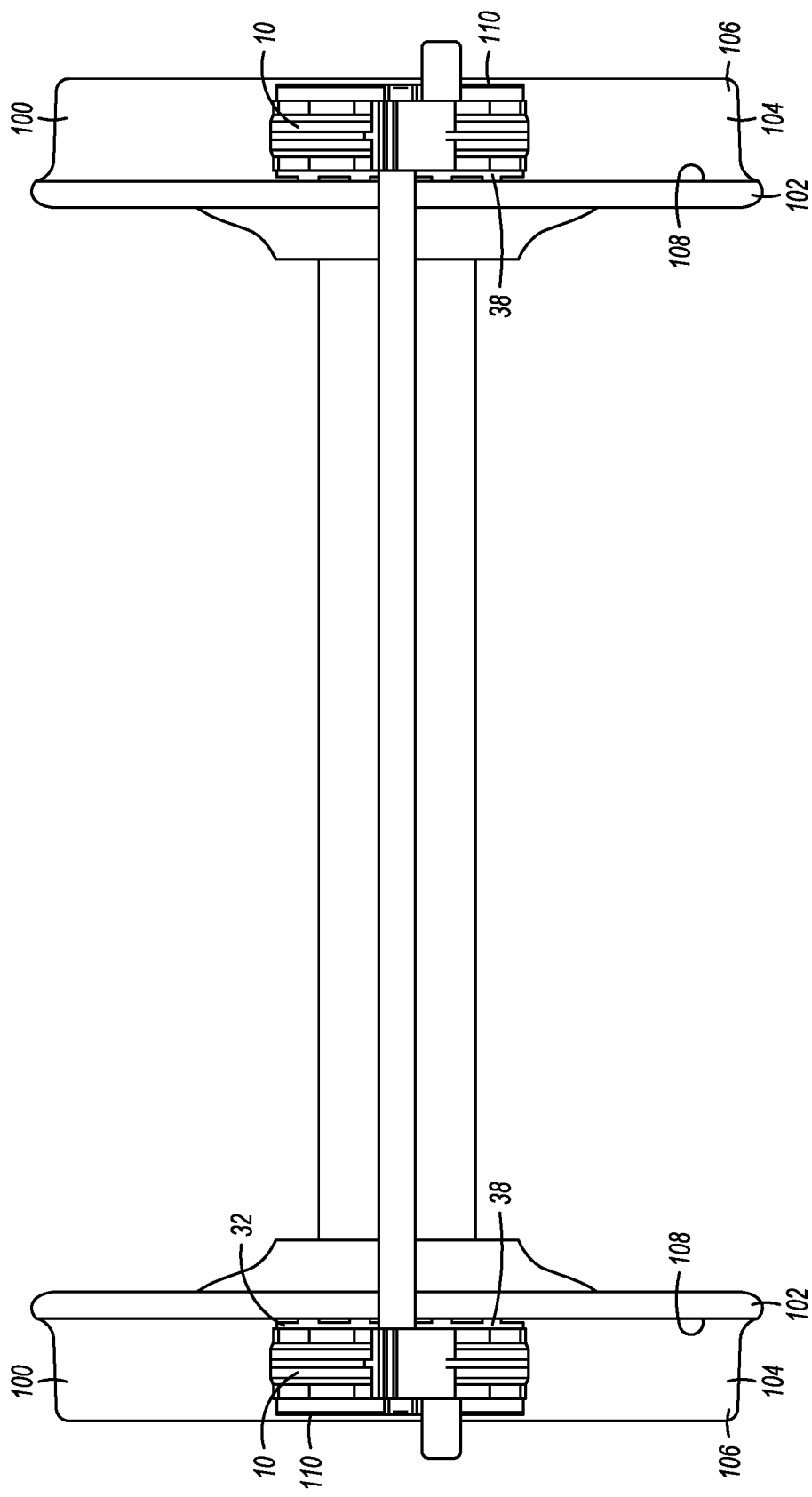
FIG. 12 is a top view of two friction devices applied to flanged wheels.

FIGS. 10-12 show an example of a friction device that includes the extended volume portion, protrusions, a wheel conditioning insert 40, and at least one void, as described above. As shown in FIGS. 10 and 12, the protrusions contact the wheel flange, and, as shown in FIG. 11, the extended volume portion and the flange contact region may contact the wheel flange (e.g., the flange root and top regions of the flange). The contact between the respective elements aligns the friction device with the wheel in a designated and controlled manner. For example, as shown in FIG. 11, the wheel conditioning insert may be aligned with the wheel rim so that the wheel conditioning insert conditions the wheel rim during use. The void(s) and a majority of the brake surface are aligned with the wheel tread to prevent over conditioning of the wheel tread while still applying a designated/desired braking force to the wheel when the friction device is actuated. As shown in FIG. 12, the alignment facilitated by the extended volume portion and the protrusions leads to the friction device remaining against the wheel surface with no overhang. A small portion 110 of the wheel rim may be exposed next to the rim side of the friction structure, further demonstrating the lack of overhang.

As discussed, it may be desirable to mitigate or prevent the lateral migration of a friction device relative to a wheel over time, to avoid or reduce degradation of the friction device and/or wheel and to maintain a desired, consistent quality of braking performance. This may be accomplished by providing a shaped or "extra-wide" friction device according to one or more examples of the invention, as set forth herein. For example, examples of the subject matter described herein relate to friction devices having an extended volume portion of the friction material that is contoured to complement a contour of a flange of the wheel. The extended volume portion may mechanically contact the flange when the friction device is applied against the wheel. Unlike other friction devices, the complementary engagement between the extended volume portion and the flange may prevent or mitigate the lateral migration of the friction device across a flanged wheel. This may maintain the proper alignment of braking and conditioning surfaces against the wheel tread, wheel flange, and/or wheel rim, reducing wear of the friction device and/or the wheel over repeated use relative to other friction devices that experience lateral migration.

In an example, a friction device (e.g., brake shoe) includes a backing plate and a friction structure (e.g., brake pad). The backing plate may interface with a brake actuator of a vehicle having a wheel with a wheel flange and a wheel tread. The friction structure is attached or coupled to the backing plate and comprises a friction material. The friction structure has a longitudinal flange side, a longitudinal rim side, and two opposing ends and defines a brake surface for engaging the wheel. The friction structure includes a tread portion on the longitudinal rim side and a flange engagement portion on the longitudinal flange side. The flange engagement portion is attached to the tread portion and defines a flange contact region of the brake surface that may at least partially engage the flange at least during initial use of the friction device with the wheel. (That is, the flange engagement portion engages the flange both when the friction device is used initially with a designated type of wheel and when the friction device is used subsequently.) For example, the flange contact region may be complementary shaped to a shape of at least part of the flange, for the flange engagement portion to engage the flange during use. A maximum thickness of the flange engagement portion at the longitudinal flange side of the friction structure, prior to use, is from 30% to 75% of a maximum thickness of the tread portion.

In an example, a friction device (e.g., brake shoe) includes a backing plate and a friction structure (e.g., brake pad). The backing plate may interface with a brake actuator of a vehicle having a wheel with a wheel flange and a wheel tread. The friction structure is attached or coupled to the backing plate and comprises a friction material. The friction structure has a longitudinal flange side, a longitudinal rim side, and two opposing ends and defines a brake surface for engaging the wheel. The friction structure includes a tread portion on the longitudinal rim side and a flange engagement portion on the longitudinal flange side. The flange engagement portion is attached to the tread portion and defines a flange contact region of the brake surface that may at least partially engage the flange at least during initial use of the friction device with the wheel. (For example, the flange contact region may be complementary shaped to a shape of at least part the flange, for the flange engagement portion to engage the flange during use.) A maximum thickness of the flange engagement portion at the longitudinal flange side of the friction structure, prior to use, is from 30% to 75% of a maximum thickness of the tread portion, a maximum width of the tread portion between the longitudinal rim side and the flange engagement portion is equal to a width of the wheel tread.

In an example, a friction device (e.g., brake shoe) includes a backing plate and a friction structure (e.g., brake pad). The backing plate may interface with a brake actuator of a vehicle having a wheel with a wheel flange and a wheel tread. The friction structure is attached or coupled to the backing plate and comprises a friction material. The friction structure has a longitudinal flange side, a longitudinal rim side, and two opposing ends and defines a brake surface for engaging the wheel. The friction structure includes a tread portion on the longitudinal rim side and a flange engagement portion on the longitudinal flange side. The flange engagement portion is attached to the tread portion and defines a flange contact region of the brake surface that may at least partially engage the flange at least during initial use of the friction device with the wheel. (For example, the flange contact region may be complementary shaped to a shape of at least part the flange, for the flange engagement portion to engage the flange during use.) A maximum thickness of the flange engagement portion at the longitudinal flange side of the friction structure, prior to use, is from 40% to 60% of the maximum thickness of the tread portion.

In an example, a friction device (e.g., brake shoe) includes a backing plate and a friction structure (e.g., brake pad). The backing plate may interface with a brake actuator of a vehicle having a wheel with a wheel flange and a wheel tread. The friction structure is attached or coupled to the backing plate and comprises a friction material. The friction structure has a longitudinal flange side, a longitudinal rim side, and two opposing ends and defines a brake surface for engaging the wheel. The friction structure includes a tread portion on the longitudinal rim side and a flange engagement portion on the longitudinal flange side. The flange engagement portion is attached to the tread portion and defines a flange contact region of the brake surface that may at least partially engage the flange at least during initial use of the friction device with the wheel. (For example, the flange contact region may be complementary shaped to a shape of at least part the flange, for the flange engagement portion to engage the flange during use.) A maximum thickness of the flange engagement portion at the longitudinal flange side of the friction structure, prior to use, is from 40% to 60% of the maximum thickness of the tread portion, a maximum width of the tread portion between the longitudinal rim side and the flange engagement portion is equal to a width of the wheel tread.

In any of the aforementioned examples of a friction device having a friction structure with a tread portion on the longitudinal rim side and a flange engagement portion on the longitudinal flange side, it may be the case that all or at least an outermost part of the flange engagement portion (as defined along the longitudinal flange side) is not backed by the backing plate.

In another example, a friction device (e.g., brake shoe) includes a backing plate and a friction structure (e.g., brake pad) attached or coupled to the backing plate. The backing plate may interface with a brake actuator of a vehicle having a wheel with a wheel flange and a wheel tread. The friction structure has a longitudinal flange side, a longitudinal rim side, and two opposing ends, and defines a brake surface for engaging the wheel. The friction structure includes a tread portion comprising a friction material on the longitudinal rim side and an extended volume portion of the friction material on the longitudinal flange side. The extended volume portion defines a flange contact region of the brake surface that may at least partially engage the flange at least during initial use of the friction device with the wheel. (For example, the flange contact region may be complementary shaped to a shape of at least part the flange, for the extended volume portion to engage the flange during use.)

In an example, a friction device (e.g., brake shoe) includes a backing plate and a friction structure (e.g., brake pad) attached or coupled to the backing plate. The friction structure may interface with a brake actuator of a vehicle having a wheel with a wheel flange and a wheel tread. The friction structure comprises a friction material, and has a longitudinal flange side, a longitudinal rim side, and two opposing ends. The friction structure defines a brake surface for engaging the wheel. The friction structure includes an extended volume portion of the friction material on the longitudinal flange side, which defines a flange contact region of the brake surface that may at least partially engage the flange at least during initial use of the friction device with the wheel. (For example, the flange contact region may be complementary shaped to a shape of at least part the flange, for the extended volume portion to engage the flange during use.)

The backing plate may be flange-less (e.g., not include a flange), and/or the longitudinal flange side of the friction structure may be dimensioned to terminate no further than a top of the wheel flange when the friction device is installed for initial use with the wheel. A maximum thickness of the friction structure at the longitudinal flange side of the friction structure, prior to use, may be from 30% to 75% of a maximum thickness of a tread potion of the friction structure that may contact the wheel tread when the brakes shoe is actuated. The friction structure may include the tread portion and the extended volume portion with the two comprising a monolithic block of the friction material. At least an outermost part of the extended volume portion (in the flange direction) may not be backed by the backing plate.

The maximum thickness of the friction structure at the longitudinal flange side of the friction structure, prior to use, may be from 40% to 60% of the maximum thickness of the tread portion of the friction structure. The flange contact region of the brake surface may be initially complementary shaped to a shape of a flange root at an area of contact engagement between the extended volume portion and the flange root. The friction device may further include at least one protrusion extending from the extended volume portion of the friction material. The at least one protrusion is complementary shaped to the shape of the flange and the flange root at a location of contact engagement between the at least one protrusion and the flange and flange root. The at least one protrusion may include a plurality of protrusions on the extended volume portion of the friction material, one or more of the protrusions may have a first shaped portion nearest the backing plate and a second, differently shaped portion nearest the brake surface, e.g., the first shaped portion may be differently tapered than a taper of the second shaped portion.

The friction device may include at least one wheel conditioning insert disposed within the friction material and comprising a material different than the friction material. The at least one wheel conditioning insert may have an elongated portion that is offset from a central longitudinal axis of the brake surface and lying adjacent and generally parallel to the longitudinal rim side of the friction structure. An entirety of the at least one wheel conditioning insert may be offset from a central longitudinal axis of the friction device and lies adjacent and generally parallel to the longitudinal rim side of the friction material. The at least one wheel conditioning insert may be generally T-shaped relative to a surface of the insert that is parallel to the brake surface and includes a first elongated portion that is offset from a central longitudinal axis of the brake surface and lies adjacent and generally parallel to the longitudinal rim side of the friction structure, and a second elongated portion substantially perpendicular to the first portion and extending toward the longitudinal flange side of the friction structure. The at least one wheel conditioning insert may include a plurality of wheel conditioning inserts disposed within the friction material. An entirety of each of the wheel conditioning inserts may be offset from a central longitudinal axis of the friction device and lies adjacent and generally parallel to the longitudinal rim side of the friction structure.

The friction structure may define at least one void in the friction material. Each void may be defined by an opening in the friction structure coincident with the brake surface and one or more sidewalls extending into the friction structure down from the opening. For example, the opening may be oval, circular, or polygonal in shape.

A friction device (e.g., brake shoe) may include a friction structure (e.g., brake pad) having a brake surface, part of which (i.e., a tread region) may engage a tread of a wheel to slow or stop movement of the wheel. The friction structure may include an extended volume portion disposed along a longitudinal flange side of the friction structure. A contact surface of the extended volume portion may be complementary to a contour of a flange of the wheel adjacent to the tread, and the contact surface may engage the flange when the friction structure is applied against the wheel.

The friction device may include a backing plate adapted to interface with a brake actuator (e.g., brake head) of a vehicle that includes the wheel. The friction structure may be secured to the backing plate. The contact surface of the extended volume portion may be angled relative to tread region. The contact surface may be arcuate, polygonal, S-shaped, or multi-segmented. The extended volume portion may include an exposed surface that extends above the flange of the wheel when the friction structure is applied against the wheel. The friction structure may include at least one protrusion extending from the extended volume portion. The contact surface of the extended volume portion may be disposed between the at least one protrusion and the brake surface.

The at least one protrusion may have a shape that is complementary to the flange and may contact the flange when the friction structure is applied against the wheel. Each protrusion of the at least protrusion may have a rectangular parallelepiped-shaped portion connected to a wedge-shaped portion. The wedge-shaped portion may be disposed between the contact surface and the rectangular parallelepiped-shaped portion. The wedge-shaped portion may taper from the rectangular parallelepiped-shaped portion to the contact surface. The friction device may include at least one wheel conditioning insert disposed within the friction structure along the brake surface. The at least one wheel conditioning insert may be formed of a different material than the friction structure.

The friction device may include at least one void disposed within the friction structure along the brake surface.

Another friction device (e.g., brake shoe) for use on a vehicle may include a backing plate and a friction structure (e.g., brake pad) disposed on the backing plate. The backing plate may be adapted to interface with a brake actuator/system (e.g., brake head) of the vehicle. The friction structure may be composed of a friction material that defines a brake surface. A tread region of the friction structure may engage a tread of a wheel of the vehicle to slow or stop movement of the wheel. The friction structure may include an extended volume portion disposed along a longitudinal flange side of the friction structure. A contact surface of the extended volume portion may be complementary to a contour of a flange of the wheel adjacent to the tread. The contact surface may engage the flange when the friction structure is applied against the wheel.

The contact surface of the extended volume portion may be angled relative to the tread region of the brake surface. The contact surface may be arcuate, polygonal, S-shaped, or multi-segmented. The extended volume portion may include an exposed surface that extends above the flange of the wheel when the friction structure is applied against the wheel. The friction structure may include at least one protrusion extending from the extended volume portion. The contact surface of the extended volume portion may be disposed between the at least one protrusion and the brake surface. The at least one protrusion may include multiple protrusions aligned in a row between the backing plate and the contact surface of the extended volume portion of the friction structure.

The at least one protrusion may have a shape that is complementary to the flange and may contact the flange when the friction structure is applied against the wheel. The friction device may include (i) at least one wheel conditioning insert disposed within the friction material along the brake surface and/or (ii) at least one void disposed within the friction material along the brake surface.

Another friction device may include a friction structure. The friction structure may include a brake surface that has a tread region that may engage a tread of a wheel to slow or stop movement of the wheel. The friction structure may include an extended volume portion disposed along a longitudinal flange side of the friction structure. The extended volume portion may include a contact surface that is angled relative to the tread region and may be complementary to a contour of a flange of the wheel adjacent to the tread. The contact surface may engage the flange when the friction structure is applied against the wheel. The friction structure may include at least one protrusion extending from the extended volume portion and may engage the flange when the friction structure is applied against the wheel. The contact surface of the extended volume portion may be disposed between the at least one protrusion and the tread region.

A method of forming a friction device for use on a vehicle may include providing a backing plate adapted to interface with a brake actuator (e.g., brake head) of the vehicle, and disposing a friction material onto the backing plate to form a friction structure that defines brake surface for engaging a wheel of the vehicle. The friction structure may include a longitudinal flange side, a longitudinal rim side, and two opposing ends. An extended volume portion of the friction material may be provided on the longitudinal flange side to at least partially engage a flange on the wheel of the vehicle when the friction device is applied against the wheel. The extended volume portion engaging the flange may align the brake surface of the friction structure with a wheel tread of the wheel. The brake surface of the friction device may be initially complementary shaped to a shape of the flange at a location of contact engagement between the extended volume portion and the flange. The method may include providing a plurality of protrusions on the extended volume portion of the friction material. At least one of the protrusions may have a first shaped portion nearest the backing plate and a second shaped portion nearest the brake surface. The first shaped portion may be differently shaped from the second shaped portion. The first shaped portion may be differently tapered than a taper of the second shaped portion.

A method of forming a friction device for use on a vehicle may include providing a backing plate as described herein, and, separately from the backing plate, forming a friction structure, comprising a friction material, that defines a brake surface for engaging a wheel of the vehicle. Then, the friction structure is secured to the backing plate, e.g., using an adhesive, thermocompression, welding, etc.

A suitable backing plate (and friction device more generally) may be flange-less, meaning lacking a U-shaped or otherwise-shaped metal flange, attached to or otherwise part of the backing plate, for wrapping around and up and over a wheel flange for alignment purposes. By omitting a metal alignment flange, the friction device may be less expensive to manufacture while having improved braking properties. Depending on the particular shape/configuration of the wheel with which the friction device is intended for use, the friction device, in addition to the friction structure having an extended volume portion, may be outfitted with a metal flange or other supplemental alignment features, for alignment of the friction device with the wheel during use.

The singular forms "a," "an," and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

Spatial or directional terms, such as "left," "right," "inner," "outer," "above," "below," and the like, relate to the disclosure as shown in the drawing figures and are not to be considered as limiting as the disclosure can assume various alternative orientations. All numbers and ranges used in the specification and claims are to be understood as being modified in all instances by the term "about." By "about" is meant plus or minus twenty-five percent of the stated value, such as plus or minus ten percent of the stated value. However, this should not be considered as limiting to any analysis of the values under the doctrine of equivalents. Unless otherwise indicated, all ranges or ratios disclosed herein are to be understood to encompass the beginning and ending values and any and all subranges or sub-ratios subsumed therein. For example, a stated range or ratio of "1 to 10" should be considered to include any and all subranges or sub-ratios between (and inclusive of) the minimum value of 1 and the maximum value of 10; that is, all subranges or sub-ratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements. The term "at least" is synonymous with "greater than or equal to". The term "not greater than" is synonymous with "less than or equal to." As used herein, "at least one of" is synonymous with "one or more of." For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. The terms "includes," "including," "have," and "having" are synonymous with "comprises."

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the terms "perpendicular" or "substantially perpendicular" mean a relative angle as between two objects at their real or theoretical intersection is from 85° to 95°, or from 87° to 93°, or from 88° to 92°, or from 89° to 91°, or from 89.5° to 90.5°, or from 89.75° to 90.25°, or from 89.9° to 90.1°, inclusive of the recited values.

This written description uses examples to disclose the embodiments of the invention, including the best mode, and to enable a person of ordinary skill in the art to practice the examples, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A friction device comprising:
   a backing plate configured to interface with a brake actuator of a vehicle having a wheel with a wheel flange and a wheel tread; and
   a friction structure attached to the backing plate and comprising a friction material, the friction structure defining a central longitudinal axis, the friction structure having a longitudinal flange side, a longitudinal rim side, and two opposing ends and defining a brake surface for engaging the wheel, and
   the friction structure includes an extended volume portion of the friction material on the longitudinal flange side, the extended volume portion defining a flange contact region of the brake surface that may at least partially engage the flange at least during initial use of the friction device with the wheel, the friction device further comprising:
   at least one wheel condition insert disposed within the friction structure, wherein an entirety of the at least one wheel conditioning insert is positioned on one side of the central longitudinal axis of the friction device adjacent the longitudinal rim side.

2. The friction device of claim 1, wherein the friction structure comprises a tread portion configured to align with and contact the wheel tread when the friction device is actuated.

3. The friction device of claim 1, wherein a first thickness of the friction structure at the longitudinal flange side of the friction structure is between 40% to 60% of a second thickness of the tread portion.

4. The friction device of claim 1, wherein at least part of the flange contact region of the brake surface is complementary shaped to a shape of a flange root at an area of contact engagement between the extended volume portion and the flange root.

5. The friction device of claim 1, further comprising:
at least one protrusion extending from the extended volume portion of the friction material, wherein the at least one protrusion is complementary shaped to a shape of at least a portion of the wheel flange.

6. The friction device of claim 5, wherein the at least one protrusion comprises a plurality of protrusions on the extended volume portion of the friction material.

7. The friction device of claim 5, wherein the at least one protrusion has a first shaped portion nearest the backing plate and a second, differently shaped portion nearest the brake surface.

8. The friction device of claim 7, wherein the first shaped portion is differently tapered than a taper of the second shaped portion.

9. The friction device of claim 1, wherein the least one wheel conditioning insert comprises a material different than the friction material.

10. The friction device of claim 9, wherein the at least one wheel conditioning insert has an elongated portion that is offset from the central longitudinal axis of the brake surface and lying adjacent and parallel to the longitudinal rim side of the friction structure.

11. The friction device of claim 9, wherein the at least one wheel conditioning insert lies adjacent and generally parallel to the longitudinal rim side of the friction material.

12. The friction device of claim 9, wherein the at least one wheel conditioning insert includes a first elongated portion that is offset from the central longitudinal axis of the brake surface and a second elongated portion perpendicular to the first elongated portion and extending toward the longitudinal flange side of the friction structure.

13. The friction device of claim 9, wherein the at least one wheel conditioning insert comprises a plurality of wheel conditioning inserts disposed within the friction material, and wherein an entirety of each of the wheel conditioning inserts are positioned on the one side of the central longitudinal axis of the friction device adjacent to the longitudinal rim side of the friction structure.

14. The friction device of claim 9, wherein the friction structure defines at least one void in the friction material, the void defined by an opening in the friction structure coincident with the brake surface and one or more sidewalls extending into the friction structure from the opening.

15. The friction device of claim 1, wherein the friction structure defines at least one void in the friction material, the void defined by an opening in the friction structure coincident with the brake surface and one or more sidewalls extending into the friction structure from the opening.

16. The friction device of claim 15, wherein the opening is oval, circular, or polygonal in shape.

17. A friction device comprising:
a backing plate configured to interface with a brake actuator of a vehicle having a wheel with a wheel flange and a wheel tread; and
a friction structure attached to the backing plate and comprising a friction material, the friction structure defining a central longitudinal axis, the friction structure having a longitudinal flange side, a longitudinal rim side, and two opposing ends and defining a brake surface for engaging the wheel, and
the friction structure includes a tread portion on the longitudinal rim side and a flange engagement portion on the longitudinal flange side, the flange engagement portion attached to the tread portion and defining a flange contact region of the brake surface that may at least partially engage the wheel flange at least during initial use of the friction device with the wheel, the friction device further comprising:
at least one wheel condition insert disposed within the friction structure, wherein an entirety of the at least one wheel conditioning insert is positioned on one side of the the central longitudinal axis of the friction device adjacent the longitudinal rim side, and
a first thickness of the flange engagement portion at the longitudinal flange side of the friction structure is in a range of from about 30% to about 75% of a second thickness of the tread portion.

18. The friction device of claim 17, wherein the first thickness of the flange engagement portion at the longitudinal flange side of the friction structure, prior to use, is from 40% to 60% of the second thickness of the tread portion.

19. The friction device of claim 17, wherein a first width of the tread portion between the longitudinal rim side and the flange engagement portion is equal to a second width of the wheel tread.

20. A friction device comprising:
a backing plate configured to interface with a brake actuator of a vehicle having a wheel with a wheel flange and a wheel tread; and
a friction structure attached to the backing plate, the friction structure defineing a central longitudinal axis, the friction structure having a longitudinal flange side, a longitudinal rim side, and opposite ends, the friction structure defining a brake surface for engaging the wheel, and
the friction structure includes a tread portion comprising a friction material on the longitudinal rim side and an extended volume portion of the friction material on the longitudinal flange side, the extended volume portion defining a flange contact region of the brake surface that may at least partially engage the wheel flange at least during initial use of the friction device with the wheel, the friction device further comprising:
at least one wheel condition insert disposed within the friction structure, wherein the at least one wheel conditioning insert includes a first elongated portion and a second elongated portion, wherein an entirety of the first elongated portion of the at least one wheel conditioning insert is positioned on one side of the central longitudinal axis of the friction device adjacent the longitudinal rim side, and wherein the second elongated portion is perpendicular to the first elongated portion and extends toward the longitudinal flange side of the friction structure.

* * * * *